United States Patent
Chae et al.

(10) Patent No.: US 10,172,152 B2
(45) Date of Patent: Jan. 1, 2019

(54) METHOD AND APPARATUS FOR DEVICE-TO-DEVICE UE FOR TRANSCEIVING SIGNAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR); Hakseong Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 15/111,694

(22) PCT Filed: Jan. 28, 2015

(86) PCT No.: PCT/KR2015/000903
§ 371 (c)(1),
(2) Date: Jul. 14, 2016

(87) PCT Pub. No.: WO2015/115793
PCT Pub. Date: Aug. 6, 2015

(65) Prior Publication Data
US 2016/0338021 A1  Nov. 17, 2016

Related U.S. Application Data

(60) Provisional application No. 61/932,741, filed on Jan. 28, 2014, provisional application No. 61/936,848, (Continued)

(51) Int. Cl.
*H04W 72/12* (2009.01)
*H04W 76/14* (2018.01)
(Continued)

(52) U.S. Cl.
CPC ....... *H04W 72/1263* (2013.01); *H04L 5/0048* (2013.01); *H04L 5/14* (2013.01);
(Continued)

(58) Field of Classification Search
None
See application file for complete search history.

(56) References Cited

U.S. PATENT DOCUMENTS 8,218,516 B1 * 7/2012 Donovan .............. H04J 3/0658
370/213
2013/0258882 A1  10/2013 Dinan
(Continued)

FOREIGN PATENT DOCUMENTS

CN  1536925 A  10/2004
CN  102083187 A  6/2011
(Continued)

OTHER PUBLICATIONS

Intel Corporation: "On D2D Discovery Transmission Timing", R1-135955, 3GPP TSG RAMN WG1 Meeting # 75, San Francisco, USA, Nov. 11-15, 2013.*
(Continued)

*Primary Examiner* — Anh Ngoc M Nguyen
(74) *Attorney, Agent, or Firm* — Dentons US LLP

(57) ABSTRACT

An embodiment according to the present invention, with respect to a method for a device-to-device (D2D) UE for transceiving a signal, comprises the steps of: receiving a D2D communication resource configuration; and transmitting a D2D communication signal on the basis of the D2D communication resource configuration, wherein if the UE transmits a D2D communication signal by means of a resource indicated by a base station, then the D2D communication signal is transmitted in a first timing determined from a value indicating a timing offset between uplink and
(Continued)

downlink radio frames ($N_{T4}$), and if the UE selects a resource which will transmit the D2D communication signal, then the D2D communication signal is transmitted in a second timing determined without regard to the value indicating the timing offset between the uplink and downlink radio frames ($N_{T4}$).

12 Claims, 8 Drawing Sheets

Related U.S. Application Data filed on Feb. 6, 2014, provisional application No. 61/938,684, filed on Feb. 11, 2014, provisional application No. 61/973,824, filed on Apr. 1, 2014, provisional application No. 62/001,617, filed on May 21, 2014, provisional application No. 62/002,174, filed on May 22, 2014, provisional application No. 62/027,233, filed on Jul. 21, 2014, provisional application No. 62/034,761, filed on Aug. 7, 2014, provisional application No. 62/055,643, filed on Sep. 25, 2014, provisional application No. 62/063,390, filed on Oct. 13, 2014.

(51) Int. Cl.
| | |
|---|---|
| *H04W 8/00* | (2009.01) |
| *H04L 5/00* | (2006.01) |
| *H04W 56/00* | (2009.01) |
| *H04W 72/04* | (2009.01) |
| *H04W 72/10* | (2009.01) |
| *H04L 5/14* | (2006.01) |
| *H04L 27/26* | (2006.01) |
| *H04W 74/08* | (2009.01) |
| *H04W 92/18* | (2009.01) |

(52) U.S. Cl.
CPC ......... *H04L 27/2607* (2013.01); *H04W 8/005* (2013.01); *H04W 56/001* (2013.01); *H04W 72/042* (2013.01); *H04W 72/0413* (2013.01); *H04W 72/0446* (2013.01); *H04W 72/10* (2013.01); *H04W 72/1242* (2013.01); *H04W 72/1289* (2013.01); *H04W 74/0833* (2013.01); *H04W 76/14* (2018.02); *H04W 92/18* (2013.01)

(56) References Cited

U.S. PATENT DOCUMENTS

| | | | |
|---|---|---|---|
| 2013/0273924 A1 | 10/2013 | Hakola et al. | |
| 2013/0336268 A1* | 12/2013 | Better | H04W 56/0005 370/329 |
| 2014/0112308 A1* | 4/2014 | Kwon | H04W 56/0005 370/331 |
| 2014/0293968 A1 | 10/2014 | Ebrahimi Tazeh Mahalleh et al. | |
| 2015/0094057 A1* | 4/2015 | Lu | H04W 8/005 455/434 |
| 2016/0028572 A1 | 1/2016 | Suzuki et al. | |
| 2016/0142898 A1 | 5/2016 | Poitau et al. | |
| 2017/0164388 A1 | 6/2017 | Sorrentino et al. | |

FOREIGN PATENT DOCUMENTS

| | | |
|---|---|---|
| CN | 102511189 A | 6/2012 |
| CN | 102656929 A | 9/2012 |
| WO | 2013/067686 A1 | 5/2013 |
| WO | 2013/095004 A1 | 6/2013 |
| WO | 2013/100831 A1 | 7/2013 |
| WO | 2013/122432 A1 | 8/2013 |
| WO | 2013/125925 A1 | 8/2013 |
| WO | 2013/181515 A2 | 12/2013 |
| WO | 2013/191360 A1 | 12/2013 |
| WO | 2014003430 A1 | 1/2014 |
| WO | 2015115791 A1 | 8/2015 |

OTHER PUBLICATIONS

Alcatel-Lucent: "Timing of D2D transmissions and impact on the LTE systems", R1-132071, 3GPP TSG RAN WG1 Meeting #73, Fukuoka, Japan, May 20-24, 2013.

LG Electronic, et al.: "Way forward on D2D signal transmission timing", R1-132739, 3GPP TSG RAN WG1 Meeting #73, Fukuoka, Japan, May 20-24, 2013.

Intel Corporation: "Synchronization and Timing for D2D Communication", R1-134138, 3GPP TSG RAN WG1 Meeting #74bis, Guangzhou, China, Oct. 7-11, 2013.

General Dynamics Broadband UK: "ProSe device-to-device discovery sequence design", R1-135496, 3GPP TSG-RAN1#75, San Francisco, USA, Nov. 11-15, 2013.

Ericsson: "On scheduling for D2D communication", R1-135808, 3GPP TSG RAN WG1 Meeting #75, San Francisco, USA, Nov. 11-15, 2013.

Intel Corporation: "On D2D Discovery Transmission Timing", R1-135955, 3GPP TSG RAN WG1 Meeting #75, San Francisco, USA, Nov. 11-15, 2013.

Intel Corporation, "On Resource Allocation for D2D Discovery," R1-135119, 3GPP TSG-RAN WG1 #75, San Francisco, USA, Nov. 11-15, 2013, pp. 1-6.

Alcatel-Lucent Shanghai Bell, Alcatel-Lucent, "D2D timing," R1-132994, 3GPP TSG-RAN WG1 #74, Barcelona, Spain, Aug. 19-23, 2013, pp. 1-6.

Alcatel-Lucent, Alcatel-Lucent Shanghai Bell, "Multiple Timing Advances for Carrier Aggregation," R1-113314, 3GPP TSG-RAN WG1 #66bis, Zhuhai, China, Oct. 10-14, 2011, pp. 1-4.

Motorola Mobility, "DL Timing Reference for UL CoMP," R1-122954, 3GPP TSG-RAN1 #69, Prague, Czech Republic, May 21-25, 2012, pp. 1-6.

Intel Corporation, "Discussion on Transmit Timing for D2D Communication," R1-135614, 3GPP TSG-RAN WG1 #75, San Francisco, USA, Nov. 11-15, 2013, pp. 1-4.

R1-135277:3GPP TSG-RAN1 Meeting #75,San Francisco, USA, Nov. 11-15, 2013, ETRI "On the D2DSS and PD2DSCH."

R2-120636:3GPP TSG-RAN WG2 #77, Dresden, Germany, Feb. 4-10, 2012, InterDigital Communications "MAC Timing Advance Command Control Element for SCells."

Intel Corporation, "On D2D Discovery Transmission Timing," 3GPP TSG RAN WG1 Meeting #75, Nov. 11-15, 2013, R1-135121.

General Dynamics Broadband UK, "ProSe device-to-device discovery sequence design," 3GPP TSG-RAN 1 #76, Feb. 10-14, 2014, R1-140512.

* cited by examiner

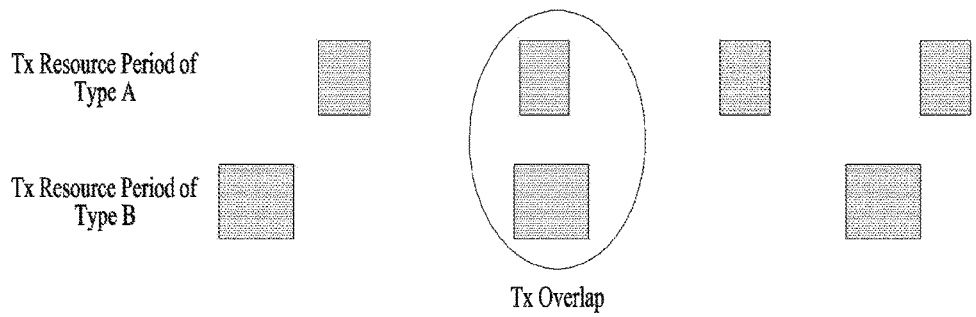
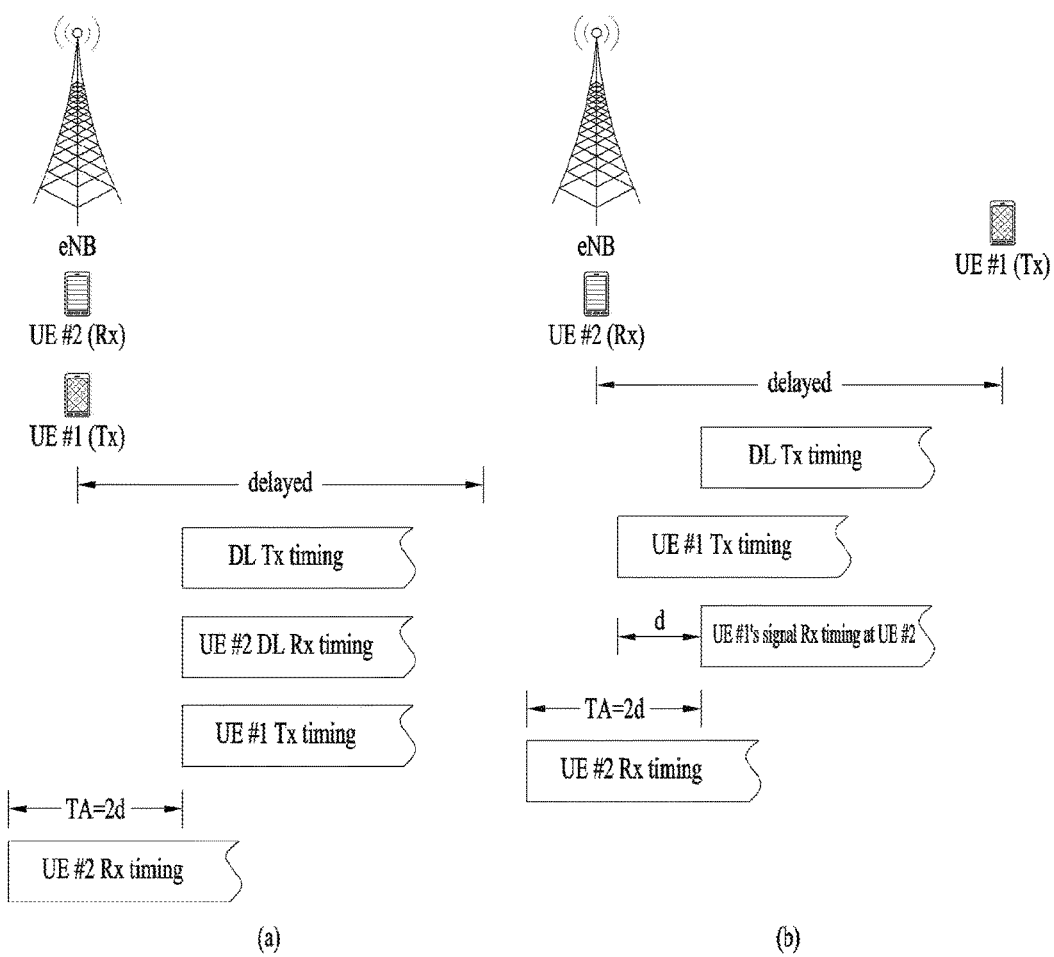

METHOD AND APPARATUS FOR DEVICE-TO-DEVICE UE FOR TRANSCEIVING SIGNAL IN WIRELESS COMMUNICATION SYSTEM

This application is a 35 USC § 371 National Stage entry of International Application No. PCT/KR2015/000903 filed on Jan. 28, 2015, and claims priority to U.S. Provisional Application Nos. 61/932,741 filed Jan. 28, 2014; 61/936,848 filed Feb. 6, 2014; 61/938,684 filed Feb. 11, 2014; 61/973,824 filed Apr. 1, 2014; 62/001,617 filed May 21, 2014; 62/002,174 filed May 22, 2014; 62/027,233 filed Jul. 21, 2014; 62/034,761 filed Aug. 7, 2014; 62/055,643 filed Sep. 25, 2014 and 62/063,390 filed Oct. 13, 2014, all of which are hereby incorporated by reference in their entireties as if fully set forth herein.

TECHNICAL FIELD

The present invention relates to a wireless communication system, and more particularly, to a method and apparatus related to a Timing Advance (TA) in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to determine whether to apply a Timing Advance (TA) in Device-to-Device (D2D) communication.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting and receiving a signal by a Device-to-Device (D2D) UE in a wireless communication system includes receiving a D2D communication resource configuration, and transmitting a D2D communication signal based on the D2D communication resource configuration. If the D2D UE transmits the D2D communication signal by using resources indicated by a base station, the D2D communication signal is transmitted at a first timing determined from a value ($N_{TA}$) indicating a timing offset between an uplink radio frame and a downlink radio frame, and if the D2D UE selects resources for transmission of the D2D communication signal, the D2D communication signal is transmitted at a second timing determined irrespective of the value ($N_{TA}$) indicating the timing offset between the uplink radio frame and the downlink radio frame.

In another aspect of the present invention, a D2D UE for transmitting and receiving a D2D signal in a wireless communication system includes a reception module, and a processor. The processor is configured to receive a D2D communication resource configuration, and to transmit a D2D communication signal based on the D2D communication resource configuration. If the D2D UE transmits the D2D communication signal by using resources indicated by a base station, the D2D communication signal is transmitted at a first timing determined from a value ($N_{TA}$) indicating a timing offset between an uplink radio frame and a downlink radio frame, and if the D2D UE selects resources for transmission of the D2D communication signal, the D2D communication signal is transmitted at a second timing determined irrespective of the value ($N_{TA}$) indicating the timing offset between the uplink radio frame and the downlink radio frame.

Reception of a Timing Advance (TA) command may be required/essential for the first timing.

The value ($N_{TA}$) indicating the timing offset between the uplink radio frame and the downlink radio frame may be determined from a TA indicated by the TA command, and the first timing may be determined from the value ($N_{TA}$) indicating the timing offset between the uplink radio frame and the downlink radio frame, and a fixed TA offset ($N_{TAoffset}$).

The first timing may be ($N_{TA}+N_{TAoffset}$)*Ts where $N_{TA}$ is the value indicating the timing offset between the uplink radio frame and the downlink radio frame, $N_{TAoffset}$ is a fixed TA offset, and Ts is a basic time unit.

$N_{TAoffset}$ may be 625 in Time Division Duplex (TDD) and 0 in Frequency Division Duplex (FDD).

The first timing may be an uplink timing of the D2D UE.

If the first timing is used, the D2D UE may be in transmission mode 1.

The second timing may not be related to a TA command.

The second timing may be predetermined.

The second timing may be $N_{TAoffset}$*Ts where $N_{TAoffset}$ is a fixed TA offset, and Ts is a basic time unit.

The second timing may be a downlink timing.

If the second timing is used, the D2D UE may be in transmission mode 2.

Advantageous Effects

According to the present invention, the efficiency of a D2D communication environment can be increased by applying a TA according to a transmission mode.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7 is a view related to priority levels of signal transmissions according to an embodiment of the present invention;
FIGS. 8, 9, and 10 are views referred to for describing TA transmission according to an embodiment of the present invention.

BEST MODE FOR CARRYING OUT THE INVENTION

Figure 1:
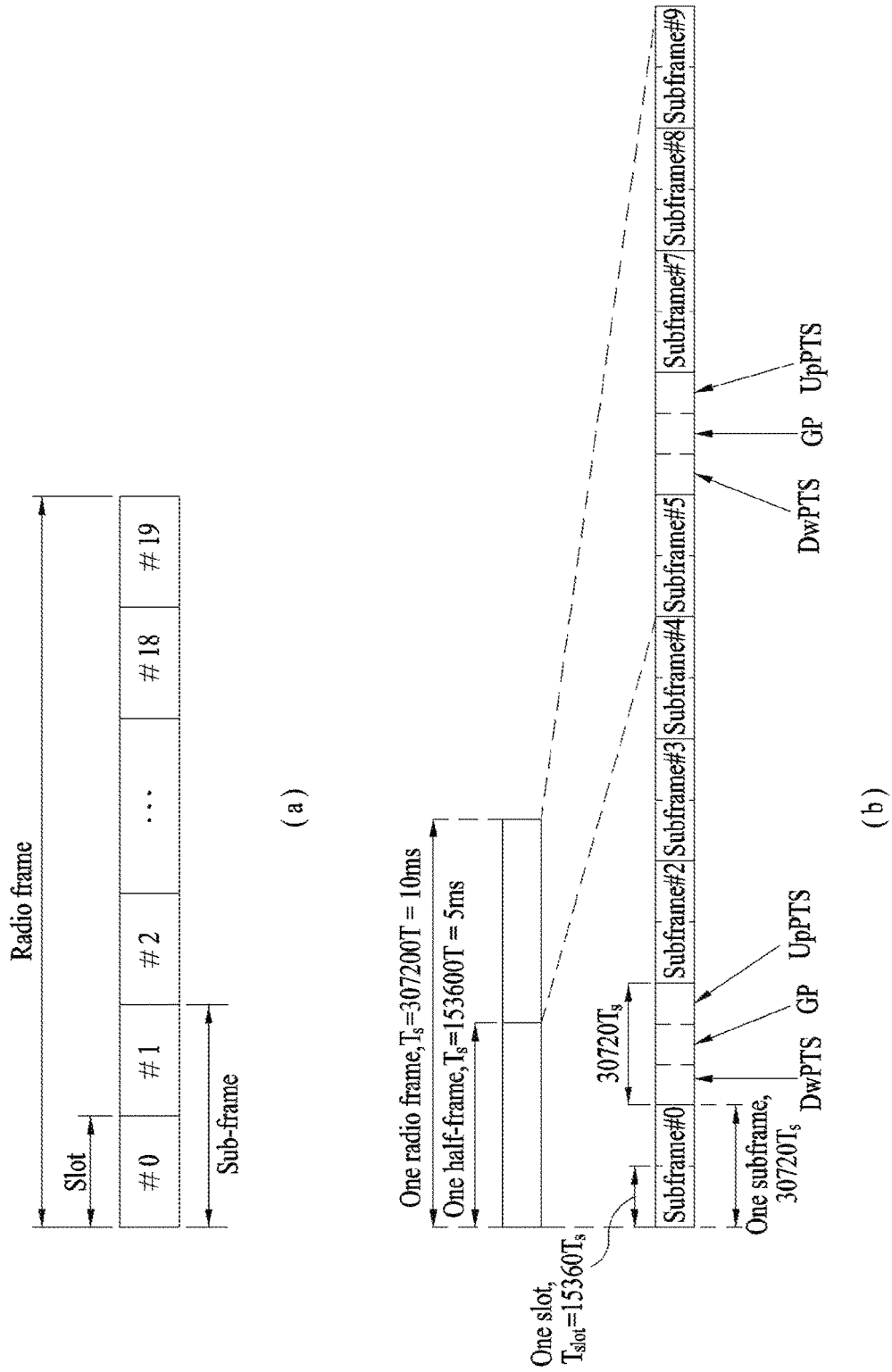
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(*b*) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
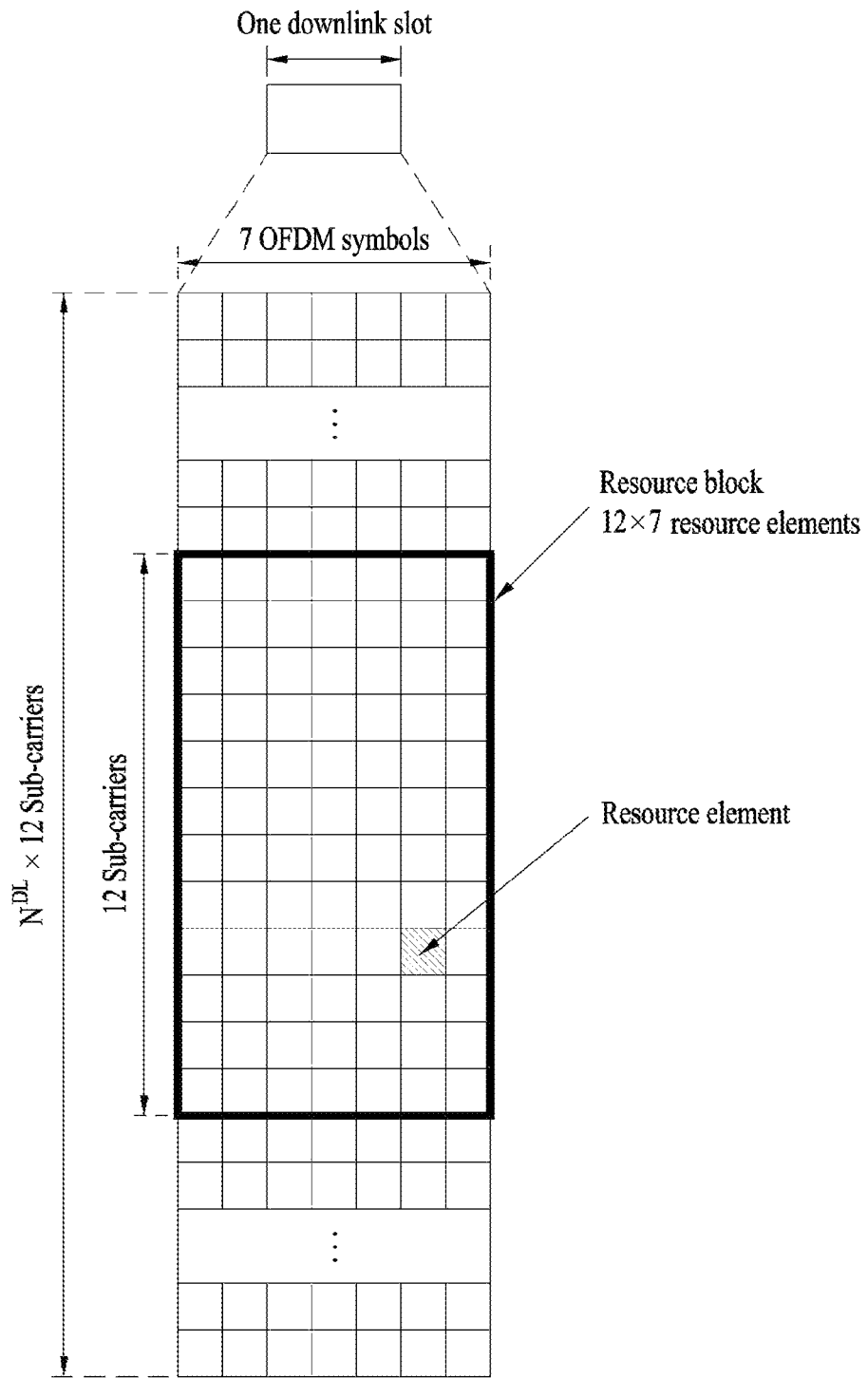
FIG. 2 illustrates a resource grid in a Downlink (DL) slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
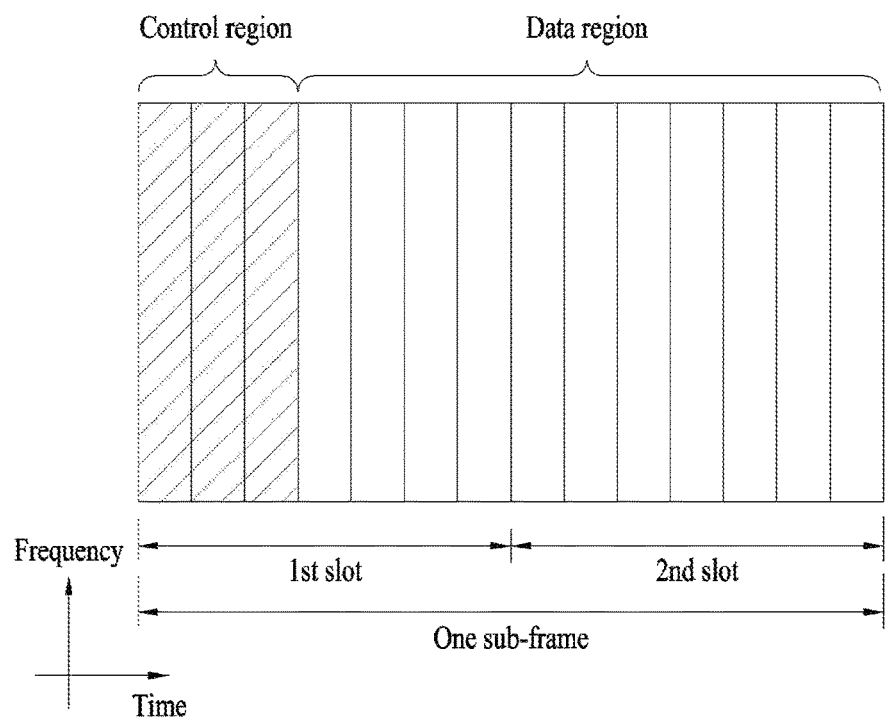
FIG. 3 illustrates a DL subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
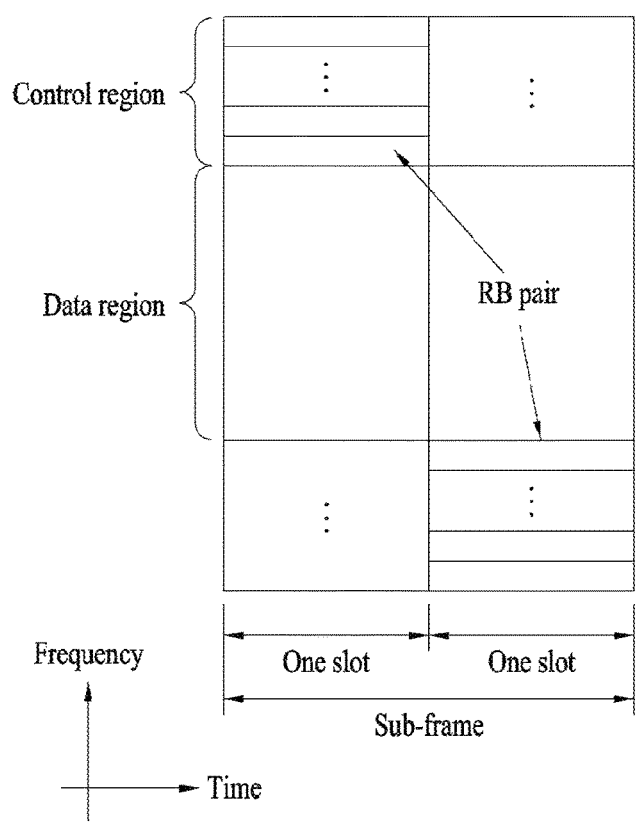
FIG. 4 illustrates an Uplink (UL) subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition of Device-to-Device (D2D) UE

If time/frequency synchronization is not acquired in an OFDM system, it may be impossible to multiplex different UEs in an OFDM signal due to Inter-Cell Interference (ICI). It is inefficient for all D2D UEs to individually acquire synchronization by transmitting and receiving Synchronization Signal (SSs) directly. Accordingly, a specific node may transmit a representative SS and the other UEs may synchronize their timings with the representative SS in a distributed node system such as a D2D communication system. In other words, some nodes (eNBs, UEs, or Synchronization Reference Nodes (SRNs) (or called synchronization sources)) may transmit a D2D SS (D2DSS) and the other UEs may synchronize with the D2DSS and then transmit and receive signals.

D2DSSs may include Primary D2DSS (PD2DSS) and Secondary D2DSS (SD2DSS). The PD2DSS may be configured to be in a similar/modified/repeated structure of a Zadoff-Chu sequence of a predetermined length or a Primary Synchronization Signal (PSS). The SD2DSS may be configured to be in a similar/modified/repeated structure of an M sequence or a Secondary Synchronization Signal (SSS). If UEs are synchronized with an eNB, the eNB serves as an SRN and its D2DSS is a PSS/SSS. A Physical D2D Synchronization Channel (PD2DSCH) may transmit (broadcast) basic (system) information (e.g., D2DSS information, information about a Duplex Mode (DM), information about a TDD UL/DL configuration, resource pool information, or information about the type of an application related to a D2DSS) that a UE should know first before D2D signal transmission and reception. The PD2DSCH may be transmitted in the same subframe as the D2DSS or a subframe following the subframe carrying the D2DSS.

An SRN may be a node that transmits a D2DSS and a PD2DSCH. The D2DSS may be a specific sequence, and the PD2DSCH may be a sequence representing specific information or a codeword produced by predetermined channel coding. Herein, the SRN may be an eNB or a specific D2D UE. In partial network coverage or out of network coverage, a UE may serve as an SRN. Also in the case of inter-cell discovery, a UE may relay a D2DSS at a time calculated by adding a predetermined offset to a reception timing of the D2DSS from the SRN so that UEs of an adjacent cell may know the timing. In other words, the D2DSS may be relayed over multiple hops. If a plurality of UEs relay the D2DSS or there are a plurality of clusters in the neighborhood, a D2DSS receiving (Rx) UE may observe a plurality of D2DSSs and receive D2DSSs over different numbers of hops.

Now, a description will be given of embodiments of the present invention related to Transmission/Reception (Tx/Rx) timings of D2D signals (a D2D communication signal, a D2D discovery signal, and the like) in D2D communication, methods for receiving the D2D signals according to the timings, a Timing Advance (TA) in D2D communication, signal transmissions from a D2D UE and their priority levels, and the like. Hereinbelow, D2D communication may be referred to as a side link. Further, in the following description, a Scheduling Assignment (SA) may be a physical-layer signal (i.e., a signal carrying D2D control information) indicating the positions of time resources and/or frequency resources for D2D signal transmission, a Modulation and Coding Scheme (MCS), and the like before the D2D signal transmission.

TA in D2D Communication a. Method for Indicating TA by Physical-Layer Signal

In D2D communication, a D2D Tx UE may also transmit a signal by using/applying a TA. Information about the TA of the D2D Tx UE (or the average (or maximum) of TAs of D2D Tx UEs within a cell, or a TA range (or maximum TA) of inter-cell UEs) may be signaled to a D2D Rx UE by a physical-layer signal or a higher-layer signal. (Or the TA information or TA-related information of the D2D Tx UE may be signaled on a PD2DSCH. Or the D2D Tx UE may transmit the TA in a physical-layer signal separately from data). As described later in the section of 'TA Application', if the D2D Tx UE transmits a D2D signal by applying the TA to the D2D signal, the D2D Rx UE is able to receive the D2D signal successfully only when the D2D Rx UE acquires the TA information from the D2D Tx UE. In the case where a Tx timing of the D2D Tx UE is determined from a TA indicated by a TA command, and the D2D Tx UE transmits TA information to the D2D Rx UE by a physical-layer signal/higher-layer signal, there is a need for addressing the case where the number of bits of a TA indicated by an eNB is different from the number of bits used to transmit the TA information to the D2D Rx UE. The D2D Tx UE may receive a TA command of 11 bits from the eNB during random access. If the D2D Tx UE transmits the TA information in fewer bits than 11 bits (e.g., in a 6-bit TA field of an SA), there may be a need for appropriate adjustment, which will be described below in detail.

In a first method, a value closest to a TA command value received from the eNB may be set as a TA value representable in the TA field of an SA, and then signaled. More specifically, the D2D Tx UE may receive a TA command, and determine a value $N_{TA}$ indicating a timing offset between a UL radio frame and a DL radio frame from a TA indicated by the TA command.

Subsequently, a TA indicator $I_{TAI}$ indicating a D2D signal reception timing adjustment value TA' may be set using the value $N_{TA}$ indicating the timing offset. The D2D Rx UE may determine a Tx timing used by the D2D Tx UE based on the TA indicator $I_{TAI}$ received in D2D control information, an SA, or a PD2DSCH, and receive a D2D signal using the determined Tx timing. When the TA indicator $I_{TAI}$ is set, the value $N_{TA}$ indicating the timing offset may be mapped to a closest value from among values representable by a field of the D2D signal reception timing adjustment value TA'. The TA indicator $I_{TAI}$ which has been set may be transmitted in the SA and/or the D2D control information.

Figure 5:
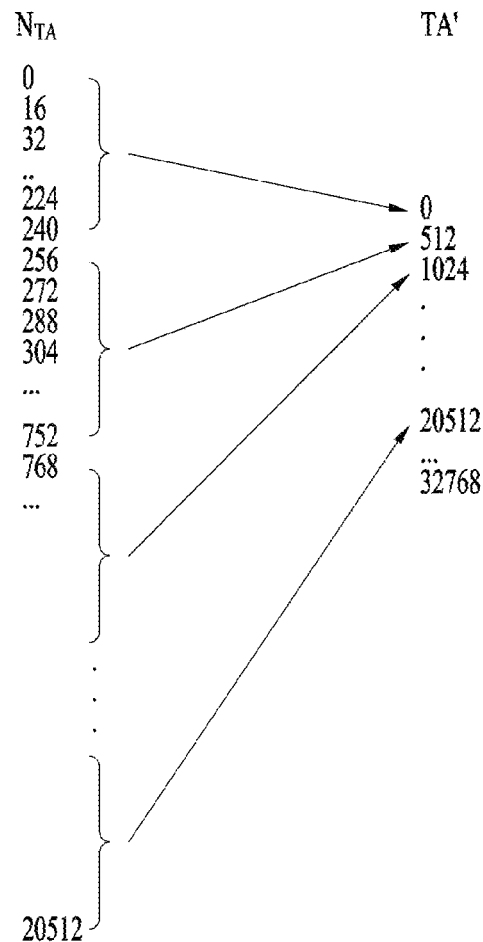
FIGS. 5 and 6 are views referred to for describing Timing Advance (TA) mapping according to an embodiment of the present invention.

More specifically, the value $N_{TA}$ indicating the timing offset may be TA*16 where the TA may be one of 0, 1, . . . , 1282. That is, $N_{TA}$ may be one of a total of 1238 values, 0, 16, 32, . . . , 20512. If 6 bits are available for the D2D Tx UE to transmit TA information, the number of cases representable with 6 bits is 64. Therefore, the value (a TA or $N_{TA}$ obtained from the TA) received from the eNB may be delivered in 6 bits only when the received value is mapped/converted to a specific value from among values representable in 6 bits. Specifically, referring to FIG. 5 in which the granularity of TA' is 512, $N_{TA}$ values 0, 16, . . . , 240 may be mapped to a closest TA' value, 0, and $N_{TA}$ values 256, 272, . . . , 752 may be mapped to a closest TA' value, 512. Referring to FIG. 5, values indicating timing offsets, $N_{TA}$ may be mapped to D2D signal reception timing adjustment values TA' in an n-to-one correspondence. Herein, n may be smaller than a value calculated by dividing a maximum 20512 of products between the values indicating timing offsets, $N_{TA}$ and 16 by the number 64 of values representable by the field indicating a D2D signal reception timing adjustment value TA'. Also, the D2D signal reception timing adjustment values TA' are mapped to TA indicators $I_{TAI}$ in a one-to-one correspondence.

In the case where the size (e.g., 11 bits) of the field indicating a TA is different from the size (e.g., 6 bits) of the field indicating a D2D signal reception timing adjustment value TA', a UE may signal a closest value to a TA command received from an eNB in the above-described manner. As a consequence, the mean error of Rx UEs may be reduced.

In a second method, a closest value larger than a TA command value received from the eNB may be set as a TA value representable by the TA field of an SA, and signaled. This method is designed to prevent ISI by intentionally indicating an advanced timing when an Rx UE removes a starting part of an OFDM symbol by as much as a CP length during CP removal.

In a third method, a closest value smaller than a TA command value received from the eNB may be set as a TA value representable by the TA field of an SA, and signaled. This method is designed to prevent ISI by intentionally indicating an advanced timing when an Rx UE removes an ending part of an OFDM symbol by as much as a CP length during CP removal.

Figure 6:
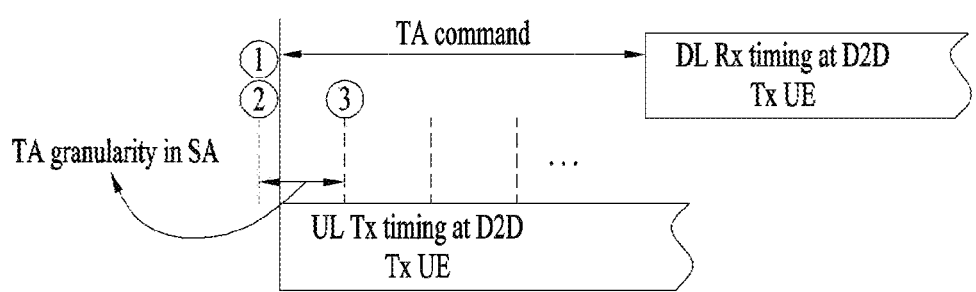

The above-described three methods are all illustrated in FIG. 6. In FIG. 6, reference numerals 1, 2, and 3 denote the positions of TA values signaled by an SA, respectively in the first, second, and third methods. That is, reference numeral 1 denotes transmission of a TA value at a position closest to the position of an actual TA command (a TA command signaled by the eNB) in an SA, reference numeral 2 denotes transmission of a TA value at a position closest to and larger than the position of the actual TA command in an SA, and reference numeral 3 denotes transmission of a TA value at a position closest to and smaller than the position of the actual TA command in an SA, in FIG. 6.

The above-described methods may be performed in combination. For example, if the difference between an actual TA and a closest value representable by the TA field of an SA is equal to or less than a predetermined value, the closest value may be signaled. On the other hand, if the difference is equal to or larger than the predetermined value, Method 2 or Method 3 may be performed in order to prevent ISI that may be generated during CP removal of an Rx UE. If a semi-static offset is configured in each resource pool in the proposed methods, one of the methods is selected in consideration of the semi-static offset and then signaled. Meanwhile, in the case where a value different from a TA configured by an eNB is signaled on purpose, the value may be set in the TA field of an SA and transmitted in one of the proposed methods, which will be described below.

Aside from the above methods for indicating a TA of a D2D Tx UE by a physical-layer signal, a TA may be indicated in the middle of communication, as described below. Depending on how a TA of a D2D Tx UE is indicated, D2DSSs may need to be used separately for D2D communication and D2D discovery. Accordingly, a D2D Rx UE may need to track the two D2DSSs separately (particularly, the D2D Rx UE may track a timing and a frequency irrespective of the usages of the D2DSSs).

b. Method for Indicating TA During Communication

A D2D Tx UE may transmit an initial packet at a DL timing and then transmit a data packet including a TA received from an eNB. Since the transmission of the data packet, the D2D Tx UE may transmit a signal by applying the TA to the signal. In this case, the format of the initial transmission packet may be affected by the TA. D2D communication subframe formats may be configured separately for transmission at a DL timing and for transmission at a PUSCH timing. Specifically, in the format for transmission at a DL timing (if a PUSCH or PUCCH is transmitted subsequently), an area corresponding to the TA in a last part of a subframe is left empty as a guard period without signal mapping. The size of this area is configurable. Simply, as many OFDM symbols calculated by ceil or floor(TA/symbol length) are not used. Herein, an RRC-idle UE which initially transmits a communication packet is highly likely not to know its TA. Therefore, in this case, a maximum TA of a cell may be signaled to the UE in advance by a higher-layer signal such as an RRC signal, or a physical-layer signal. Upon receipt of the maximum TA, the UE may set a guard period based on the maximum TA when transmitting an initial packet or when transmitting a D2D communication signal without a TA. In other words, a last certain part of a subframe may be left unused.

In TDD, a subframe intended to indicate a TA may be confined to a specific UL subframe (e.g., a UL subframe preceding a DL subframe). Or D2D communication subframes may be confined to consecutive UL subframes preceding a DL subframe in TDD. In this case, a TA-indicating subframe may be transmitted at a DL timing or with a fixed offset (624 Ts to 20 us). If the TA-indicating subframe is transmitted at the DL timing, a guard period for Tx/Rx switching may be defined in a last area of the subframe. If the TA-indicating subframe has a fixed offset of 624 Ts, it may be transmitted without a guard period. If the TA-indicating subframe has the fixed offset of 624 Ts in TDD, a TA transmitted in a field of an SA may be set only based on a TA command value received from an eNB or an accumulated value of TA command values. That is, a value to which a TA command value, an accumulated value of TA command values, or both values are converted according to a granularity suitable for transmission in an SA, except for the offset of 624 Ts from the sum of the offset and the TA command value corresponding to a TA applied to a PUSCH and D2D data is transmitted in the SA. Upon receipt of the value, UEs set an Rx window with respect to a time determined by applying the TA included in the SA to a reception time of a D2DSS from a synchronization source, and receive a D2D signal using the Rx window. Thus, even when a D2DSS has the offset of 624 Ts, a starting time of D2D data may be determined accurately.

It is necessary to transmit a TA-indicating packet periodically like a D2DSS. Under circumstances, the TA-indicating packet may need to be transmitted with a higher periodicity because UEs listening to a D2D packet in the middle of communication may not receive the D2D packet successfully without knowledge of a TA. The TA-indicating packet may be transmitted in the same format as that of the D2DSS. For example, the D2DSS is transmitted in an area of a subframe format using a DL timing, except for a guard period (e.g., a first subframe of a specific D2D resource pool may be configured as a D2DSS subframe). Herein, a field indicating a different usage from discovery D2DSS may be included in a PD2DSCH, or the D2DSS may be transmitted in a different sequence or structure from a discovery D2DSS (different from the discovery D2DSS in terms of a repetition pattern/repetition number or arrangement of a PD2DSS and a SD2DSS).

The eNB may signal a TA or TA information (an average TA, a maximum TA, a minimum TA, or a TA range within a cell) to D2D Tx and Rx UEs by a physical-layer signal or a higher-layer signal, rather than the D2D Tx UE directly indicates the TA to the D2D Rx UE. As described above, a subframe may be transmitted at a DL timing until before the TA/TA-related information is received, and the format of the subframe may be configured based on the maximum TA. If the TA information is received later from the eNB, transmission may be performed by applying a TA +n subframes after the reception time of the TA information. Herein, a format configured for transmission with TA application may be used. Rx UEs may perform reception in the changed format, since the corresponding time.

c. TA Resolution

In the description of FIG. 6, when an 11-bit TA is transmitted in a field of a size less than 11 bits in an SA, the granularity is 512, by way of example. However, there may exist various TA resolutions (a TA resolution refers to a minimum time granularity indicated by TA bits), as described below. That is, the following description is given of a method for interpreting TA bits included in an SA, in the case where a D2D Tx UE transmits a TA received from an eNB to a D2D Rx UE and the number of TA bits received from the eNB is different from the number of the TA bits included in the SA.

The resolution of a legacy 11-bit TA is about 0.521 us, and a value indicated by TA bits included in an SA may have legacy 11-bit TA resolution. Even though x bits (x<11) are included in the SA, the legacy resolution may be used. In this case, since a TA indicated by the SA does not cover a total cell range, rough TA information may be included in a PD2DSCH or D2D data (e.g., the TA may be transmitted again with an n-bit resolution on an additional channel). Or the rough TA information may be signaled by the eNB. Or a pattern in which the SA is transmitted may be used to indicate a specific TA state. For example, given N available time/frequency patterns for SA transmission, [ log 2N] TA states may be represented. Such a TA state is used to indicate a rough TA and an accurate TA is estimated using bits included in the SA.

On the other hand, a newly defined resolution may be used. Herein, a maximum cell radius or a maximum TA of a cell may be preset or signaled to UEs by a physical-layer signal or a higher-layer signal. A D2D Tx UE may use a resolution obtained by dividing a TA corresponding to the maximum cell radius by 2x. A D2D Rx UE may perform FFT on bits included in the SA at its DL timing using the newly defined resolution, while moving an Rx window.

In another example, the resolution of a TA indicated by bits included in the SA may be a value linked to a CP length or units of a CP length. For example, a TA may be indicated with the resolution of a normal CP length or an extended CP length (or an a multiple of the normal/extended CP length where a is a preset value between 0 and 1, for example, a is 0.5) by an SA. A CP length based on the resolution is determined may be signaled by a physical-layer signal or a higher-layer signal (e.g., a System Information Block (SIB), an (Evolved) PDCCH ((E)PDCCH), or a higher-layer signal such as an RRC signal) from the eNB, or preset (e.g., the extended CP length). For example, if the SA includes an x-bit TA, a UE receiving the SA may perform FFT on the bits included in the SA with a resolution of a CP length at its DL Rx timing, while moving an Rx window.

If the bits included in the SA do not cover a TA range sufficiently, a transmission pattern of the SA may be used to indicate a specific TA state. For example, given N available time/frequency patterns for SA transmission, [ log 2N] TA states may be represented. Such a TA state is used to indicate a rough TA value and an accurate TA is estimated using the bits included in the SA.

The time resolution of a TA included in an SA in the above method may be configured in all or part of the proposed methods. A set of TA resolutions may be preset or signaled by a higher-layer signal such as an RRC signal, or a physical-layer signal. A specific value out of the TA resolution set may be set. Specifically, the specific value may be preset or signaled by a physical-layer signal or a higher-layer signal (e.g., an SIB, an (E)PDCCH, or RRC signaling) from the eNB. For example, the legacy TA resolution (16*Ts, e.g., 0.52 μs), a resolution in units of the normal CP length (144*Ts, e.g., 4.69 μs), a resolution in units of the extended CP length (512*Ts, e.g., 16.7 μs, or a value obtained by applying a predetermined scaling factor a to the CP length where a is a predetermined constant between 0 and 1) may be preset as a configurable resolution set. A specific value out of the resolution set may be preset for a UE or signaled by the eNB. In another example, the TA resolution (16*Ts, e.g., 0.52 μs), and the resolution in units of the normal CP length (144*Ts, e.g., 4.69 μs, or a value obtained by applying a predetermined scaling factor a to the CP length where a is a predetermined constant between 0 and 1) may be preset as a configurable resolution set, and the eNB may signal a specific value out of the resolution set by 1-bit signaling. In another embodiment, the TA resolution (16*Ts, e.g., 0.52 μs), and a third resolution (e.g., a resolution configured based on the afore-mentioned maximum TA of a cell) may be preset as a configurable resolution set, and the eNB may signal a specific value out of the resolution set by signaling. The third resolution may be indicated to a UE in advance by signaling such as RRC signaling or an SIB.

The eNB may directly indicate a value used as the time resolution of a TA included in an SA by a physical-layer signal or a higher-layer signal. In this case, if different cells use different resolution values or a resolution is to be indicated to a UE out of coverage from partial network coverage, there is a need for a method for indicating a resolution. As a solution, a D2DSS Tx UE may transmit the time resolution value of a TA in a D2D physical-layer signal such as a PD2DSCH. Or the time resolution value of the TA may be transmitted in a higher-layer signal on a D2D data channel.

A set of time resolutions (e.g., 16 Ts) for a TA may be configured independently of a D2D CP length. In this case, information about a TA resolution may be signaled by a physical-layer or higher-layer signal from the eNB, separately from signaling of a D2D CP length configuration.

Meanwhile, if the number of TA bits is limited, a TA resolution may be included as one of configurable TA values in order to represent a maximum cell radius with the limited number of TA bits. For example, if the number of TA bits is 6 and a maximum cell radius is 100 Km, a TA resolution covering the cell radius of 100 Km may be 320 Ts and this value may be included as one of TA values. If a maximum cell radius is x(m), a maximum TA value is $y=2x/(3*10^{15.8}8)$. If the maximum TA value is signaled in B bits, its resolution is $z=y/(2^B)$ which is expressed in units of Ts, as $r=z/(1/(15000*2048))$. If B=6 and x=100000, r is 320. If this is represented as a CP length, 0.625 (⅝)*extended CP length (512 Ts) is given. Thus, a method may be available, in which for a specific cell radius, a TA resolution may be determined using the number of bits signaled by an SA, and the network may signal the cell radius of a current eNB, instead of the TA resolution, so that a UE may derive the TA resolution from the cell radius. This method may be modified such that a set of cell radiuses may be preset and a specific value out of the cell radius set according to the cell radius of a current eNB may be signaled to a UE by a higher-layer signal or a physical-layer signal. Or a set of TA resolutions for a set of supported cell radiuses may be preset, and a specific value out of the TA resolution set according to the cell radius of a current eNB may be signaled to a UE by a higher-layer signal or a physical-layer signal.

Meanwhile, in the case where a D2D Tx UE transmits a D2D signal using a TA and the TA is indicated by an SA, a UE receiving the TA may operate differently according to its RRC state. An RRC idle-mode Rx UE may detect a rough Rx timing position using one of the afore-described TA resolution values by means of the TA received in the SA from the D2D Tx UE, and estimate an accurate Rx timing through Demodulation Reference Signal (DMRS) correlation. In contrast, an RRC connected-mode Rx UE may estimate an accurate 1-FT window timing through DMRS correlation based on its TA, instead of the TA transmitted by the D2D Tx UE. Or the RRC connected-mode Rx UE may determine a rough FFT window time point using both of its TA and the TA transmitted by the D2D Tx UE (e.g., by averaging the TAs), and estimate an accurate FFT window time through DMRS correlation based on the rough FFT window time point. Or the RRC connected-mode UE may set a rough Rx time point by averaging its TA instead of the TA transmitted by the D2D Tx UE, and a timing value indicated to the D2D Tx UE. If it is certain that all D2D Rx UEs are in the RRC connected mode, the D2D Tx UE may not transmit a TA in an SA and the TA field of the SA may be used for other purposes. For example, if all of unicast Tx UE and Rx UEs are in the RRC connected mode, Hybrid Automatic Repeat reQuest (HARQ) Redundancy Version (RV) information or Transmit Power Control (TPC) information between D2D UEs may be transmitted in the TA field of the SA. If the D2D Tx UE does not use a TA, 1) the SA may not carry the TA field, or 2) the TA field may be set to a specific state (e.g., all zeros or all ones) and used for the usage of a virtual CRC. Or 3) if the TA field is not used (all or none of the Tx and Rx UEs use a TA), the TA field may be used for the usage of transmitting other information or confirming already transmitted information. For example, an RV may be transmitted using the TA field of the SA. The remaining part of the TA field except for the part indicating the RV may be used for the usage of transmitting other information or may be set to a specific state and used for the usage of a virtual CRC.

Meanwhile, a TA resolution may be used adaptively according to a TA range. For example, if a 6-bit TA field is included in an SA, a total of 64-step TA ranges may be configured. If a TA value is within 64*16 Ts, 16 Ts is used as a TA resolution. If a TA value is between 64*16 Ts and 144 Ts*64, 144 Ts is used as a TA resolution, and if a TA value is larger than 144*64 Ts, 512 Ts is used as a TA resolution. This operation for changing a TA resolution adaptively may be set cell-specifically or UE-specifically. In other words, in a cell-specific case, the eNB may set a TA resolution based on a maximum TA of the cell and signal the TA resolution to a UE, whereas in a UE-specific case, a D2D Tx UE or a D2D Rx UE may adaptively change a TA resolution according to its TA value.

Meanwhile, a different TA granularity may be set for each TA state. For example, if a TA is represented in X bits, a granularity of A Ts may be set for up to X1 bits and a granularity of B Ts (e.g., B>A) may be set for the remaining X2 bits (=X−X1 bits). However, this method for differentiating a granularity according to a state is not limited to two steps as in this example. Rather, granularities may generally be set for the respective states in the form of a table. A granularity for each TA state may be preset or signaled to a UE by a physical-layer signal or a higher-layer signal from the network. This method seeks to help a D2D Rx UE to detect an accurate Rx timing at an indicated time point by indicating an accurate TA with a fine granularity for a practical cell size (e.g., within 2 km) and indicating a rough TA for a cell size which is not usually used (e.g., beyond 2 km). Herein, X1, X2, A, and B values (granularities for respective states) may be set depending on whether UEs are capable of detecting an accurate Rx timing from a rough timing, and each UE may signal its capability to the network so that the network may signal these values. Or the network may perform an operation such as increasing a retransmission number or transmission power, expecting performance degradation according to a UE capability. If most of UEs within a cell do not have the detection capability, the network may set more fine granularities. If UEs within a cell are capable of detecting an Rx timing in a wide range, the network may set more coarse granularities and support larger cell sizes. The UE capability of detecting an accurate timing based on a TA indicated by an SA may be represented as a timing detection window size based on the indicated TA. For example, if some UEs may detect +-A Ts based on a TA and other UEs may detect +-B Ts based on the TA, each UE may signal the window size value A or B to the network. Herein, the window size may be 0 in an extreme case, and the UE may be assumed to perform no additional detection based on the indicated TA. The network may appropriately set a granularity according to a TA state based on a UE capability or a UE detection window size, or perform any other change operation (increasing Tx power or a retransmission number).

TA Application

A TA as described before may be used for D2D communication. However, TA application may be optional. For example, a TA may or may not be applied according to a Tx mode, a distance from an eNB, or the like, which will be described below.

a. TA Application According to Tx Mode

In D2D communication, upon receipt of a D2D communication resource configuration, a UE may transmit a D2D communication signal based on the D2D communication resource configuration. The UE may operate in (D2D) Tx mode 1 or (D2D) Tx mode 2. Tx mode 1 corresponds to a case in which a UE transmits a D2D communication signal by using resources indicated by an eNB (i.e., the UE makes no choice of communication resources), whereas Tx mode 2 corresponds to a case in which a UE autonomously selects resources for transmission of a communication signal. A TA may or may not be applied according to which Tx mode is adopted. Specifically, if the UE transmits a D2D communication signal by using resources indicated by the eNB, the D2D communication signal may be transmitted at a first timing determined based on a value $N_{TA}$ indicating a timing offset between a UL radio frame and a DL radio frame. If the UE autonomously selects resources for transmission of a D2D communication signal, the D2D communication signal may be transmitted at a second timing determined irrespective of a value $N_{TA}$ indicating a timing offset between a UL radio frame and a DL radio frame. Since the first timing is determined based on $N_{TA}$, it may be said that the first timing is determined based on a TA. Accordingly, it is essential to receive a TA command in order to transmit a signal at the first timing. As described before, $N_{TA}$ may be determined based on a TA ($N_{TA}$=TA*16), and the first timing may be determined based on $N_{TA}$ and a fixed TA offset $N_{TAoffset}$. That is, the first timing is $(N_{TA}+N_{TAoffset})*Ts$, and $N_{TAoffset}$ is 624 in TDD and 0 in FDD. The first timing may be a UL timing of the UE (particularly, if a radio frame serving as a reference for applying a TA in D2D is a DL subframe, the first timing is, for example, a PUSCH timing).

The second timing may not be related to a TA command. Since the second timing is determined irrespective of $N_{TA}$, the second timing is applicable even when a TA is not known (e.g., a UE out of coverage). The second timing may be preset. If the second timing is preset to 0, the second timing may be $N_{TAoffset}*Ts$. The second timing may be a DL timing.

In summary, a D2D Tx timing may vary according to scheduling schemes. If eNB-granted resources are used, a TA is applied, whereas if UE-autonomously selected resources are used, a TA is not applied.

As described before, a D2D Tx timing may be determined to be a PUSCH timing or a DL timing according to a Tx mode in D2D communication, and each Tx timing has the following advantages. Therefore, these advantages may be taken in the above configuration. First, if the PUSCH timing is taken, coexistence with a WAN is good. In other words, a shortest guard period may be set in case of timing misalignment with a PUSCH, due to the same timing as the WAN. Also, if a D2D signal is transmitted using a TA, interference with the WAN is weak (due to no ISI, orthogonality is maintained between carriers).

In the case where a D2D signal is transmitted at a DL timing without a TA, if a cell radius is large, the timing difference between a D2D Tx UE and a D2D Rx UE is narrow and thus D2D signal transmission and reception is active. The use of the DL timing advantageously renders D2D signal transmission and reception to be active even for RRC-idle UEs, when a cell radius is very large. In the case of distributed scheduling (if a resource pool is configured and D2D Tx UEs transmit D2D signals in a distributed manner), RRC-idle UEs are also likely to transmit communication signals. In this case, it is difficult to know a TA and thus a D2D communication signal may be transmitted at the DL timing. In spite of distributed scheduling, a signal may be initially transmitted without a TA and then after switching to the RRC connected mode in the middle of the transmission, transmission may be performed with a TA or an offset value related to the TA. In this case, a format for transmission at a DL timing and a format for transmission with a TA or an offset related to the TA may be different, as described before (a guard period or an RS position).

For the above-described configuration, the eNB may configure resource pools separately for different resource selection schemes. Each resource pool may be divided into time areas and/or frequency areas. If a resource pool is divided into frequency areas, Inter-Carrier Interference (ICI) may occur due to a timing difference and thus some carrier at a resource pool boundary may be configured to be used as a guard band. Data may not be mapped or a receiver may perform puncturing, in this guard band. In the case of an inter-cell or partial network, a Tx timing may be different depending on a scheduling scheme used by an adjacent cell or cluster. Therefore, it may be necessary to signal a scheduling scheme used by an adjacent cell or cluster. An indication indicating what scheduling scheme is used by what resource pool, and what D2DSS is used as a reference (a D2DSS ID, D2DSS Tx resources, and whether sharing with discovery resources is possible) may be transmitted by eNB signaling, PD2DSCH, or a D2DSS sequence. In the case of eNB signaling, information about the scheduling scheme, TA, and resource pool of an adjacent cell may be shared in advance through a backhaul and may be signaled to a UE by a higher-layer signal or a physical-layer signal. All or part of the scheduling scheme of each resource pool, the usage of a D2DSS, a TA applied to the D2DSS, a TA, or a value related to the TA may be included in a PD2DSCH. D2DSS sequences may be distinguished according to scheduling schemes. In the case of D2D discovery, a UE autonomously determines resources. Therefore, if communication is conducted in a distributed manner, a timing may be shared between the D2D discovery and the distributed scheduling. Accordingly, if a specific D2DSS sequence or format is received, this may be configured to be used as a timing for D2D discovery or distributed scheduling.

b. TA Application According to Distance, Signal Strength, and the Like

An operation for determining a D2D signal Tx timing and selecting a resource pool according to the afore-described scheduling schemes may be determined according to a signal strength from an eNB (Reference Signal Received Power (RSRP)/Reference Signal Received Quality (RSRQ), (E)PDCCH Block Error Rate (BLER), SS reception performance, etc.), a connection state with the eNB, a distance to the eNB, and whether a ORS is detected or not. For example, if the strength of a signal received from an eNB is equal to or larger than a predetermined threshold, a D2D signal may be transmitted by using resources indicated by the eNB according to a TA or timing offset indicated by the eNB. On the contrary, if the strength of the signal received from the eNB is equal to or less than the predetermined threshold, a D2D signal may be transmitted in a resource pool indicated by the eNB or a pre-configured resource pool without TA application (at a DL timing or at a time point corresponding to a predetermined offset applied to the DL timing). If there are a plurality of resource pools to which a TA is applied and/or there are a plurality of resource pools to which a TA is not applied, each resource pool may be distinguished by a signal strength, or a transmission power level may be pre-configured for each resource pool so that a UE may transmit a signal with the same transmission power or only within a predetermined transmission power range in the same pool. For this purpose, the transmission power used for each resource pool or the threshold for a signal strength from an eNB may be signaled to a UE by a physical-layer signal or a higher-layer signal. In a specific example, if the strength of a signal from an eNB is equal to or larger than the predetermined threshold, the Tx timing of a D2D signal may be determined by reusing a TA value for PUSCH transmission, indicated by the eNB (or by applying a predetermined offset to a PUSCH Tx time point). If the strength of a signal from the eNB is equal to or less than the predetermined threshold, it is difficult to indicate a TA stably to an individual UE. Thus, a representative TA to be applied under a corresponding condition may be broadcast, and UEs may determine the Tx timing of a D2D signal based on the representative TA. It is preferred that the eNB sets the representative TA in such a manner that D2D signals of UEs at locations with the strength of a signal from the eNB being equal to or less than the predetermined threshold and a general PUSCH transmission signal may arrive at the eNB at similar time points. For example, the representative TA may be determined based on a maximum TA which is likely to be applied to a PUSCH Tx signal in a corresponding cell. Even though a UE determines a PUSCH Tx time to be a D2D Tx time due to the strength of a signal received from the eNB being equal to or larger than the predetermined threshold, and the strength of a signal from the eNB becomes equal to or less than the predetermined threshold due to a change in the situation, it is still possible for the UE to use the existing PUSCH Tx time as the D2D Tx time for a certain time period. In other words, the UE determines that the location of the UE and a related necessary TA will not be changed at least during a predetermined time, and even though the UE does not receive a stable TA indication for an individual UE, the UE aligns the D2D Tx timing with the PUSCH timing as much as possible by using the previous TA value.

c. TA Application and Resource Area (Pool) Configuration According to RRC Connection State Different resources and a different timing may be selected according to a connection state with an eNB. For example, if an RRC-connected UE is to transmit a D2D signal, the RRC-connected UE may always transmit the D2D signal according to a TA or an offset indicated by the eNB by using resources indicated by the eNB. If the UE is in the RRC idle mode according to its connection state with the eNB, the UE may transmit the D2D signal in a resource pool indicated by the eNB without applying a TA or an offset indicated by the eNB (a timing offset may not be indicated in the RRC idle mode). Herein, a resource area used for distributed scheduling may be separated from or partially overlapped with an eNB-granted scheduling resource area. The resource areas may be configured individually or one of the resource areas may be configured to be a complementary set of the other resource area. For example, if a distributed resource area or subframe is signaled in a bitmap, its complementary set may be regarded as an eNB-granted scheduling resource area, and a D2D signal may not be transmitted or may be transmitted with transmission power equal to or less than a predetermined level, for protection of the eNB-granted scheduling resource area against interference, in the eNB-granted scheduling resource area. In a specific example, when a UE is maintained connected to the eNB, the UE may determine a D2D Tx timing by reusing a TA value indicated for PUSCH transmission by the eNB (or by applying a predetermined offset to the PUSCH Tx time). If the UE is disconnected to the eNB, it is difficult for the eNB to indicate a stable TA value to the individual UE. Therefore, the eNB may broadcast a representative TA value and UEs may determine a D2D Tx timing based on the representative TA value. It is preferred that the eNB sets the representative TA value in such a manner that D2D signals of UEs disconnected from the eNB and general PUSCH transmission signals may arrive at the eNB at similar time points. For example, the representative TA may be determined based on a maximum TA which is likely to be applied to a PUSCH Tx signal in a corresponding cell. Even though a UE determines a PUSCH Tx time to be a D2D Tx time in a connected state to the eNB, and the connection to the eNB is not maintained due to a change in the situation, it is still possible for the UE to use the existing PUSCH Tx time as the D2D Tx time for a certain time period. In other words, the UE determines that the location of the UE and a related necessary TA value will not be changed at least during a predetermined time, and even though the UE does not receive a stable TA indication for an individual UE, the UE aligns the D2D Tx time with the PUSCH Tx time as much as possible by using the previous TA value.

Meanwhile, in the above-descried operation for determining a D2D Tx timing and selecting resources based on the strength of a signal (RSRP/RSRQ, (E)PDCCH BLER, SS Rx performance, or the like) received from an eNB, even though the strength of a signal received from an eNB is equal to or less than a pre-signaled threshold, if a UE is in the RRC-connected mode with the eNB, the UE may continue transmission using a TA by using resources indicated by the eNB. If the strength of the signal received from the eNB gets equal to or less than the threshold, the UE may indicate that the connection state between the UE and the eNB is currently unstable by transmitting a signal reporting the fact. Upon receipt of the signal, the eNB may signal, to the UE, transmission with TA=0 in a resource pool configured by the eNB or a preset resource pool (or release of the resources indicated by the eNB), without any further transmission with the TA in the resources indicated by the eNB. Or it may be agreed that after a predetermined time elapses (timeout of a timer), the UE transmitting the signal transmits a signal in a resource pool indicated by the eNB (or a preconfigured resource pool) without a TA, without using the resources and TA indicated by the eNB (in spite of the absence of a direct indication signal from the eNB). The duration of the predetermined time may be preset or signaled to the D2D UE by a higher-layer signal from the eNB. Further, a D2D UE which will (is supposed to or likely to) apply the operation change may signal the operation change by an SA directly or indirectly to a D2D Rx UE. For example, in the direct method, a bit such as an operation change notice flag is included in the SA. If transmission is performed continuously in the same operation, the flag may be set to 0, and if a change in the operation is expected, the flag may be set to 1, so that the D2D Rx UE may predict the operation change. In the indirect method, the physical-layer format of the SA is changed (e.g., a different DMRS sequence/Cyclic Shift (CS)/Orthogonal Code Cover (OCC) is used according to the flag), so that the D2D Rx UE may predict the operation change. The threshold of an eNB signal for enabling a D2D UE to perform or likely to perform the operation for changing a Tx resource configuration and timing may be signaled to the D2D UE in advance by a physical-layer signal or a higher-layer signal. If the D2D UE is out of coverage, a UE within the coverage may signal the threshold to the D2D UE by a physical-layer signal or a higher-layer signal, or the D2D UE may use a preset threshold.

Meanwhile, in the above-descried operation for determining a D2D Tx timing and selecting resources based on the strength of a signal (RSRP/RSRQ, (E)PDCCH BLER, SS Rx performance, or the like) received from an eNB, if an RRC-idle UE receives a signal from an eNB, which is equal to or larger than a pre-signaled threshold, the UE may attempt to switch to the RRC connected mode in order to connect to the eNB and be allocated D2D Tx resources from the eNB. If the UE fails in connected to the eNB for a predetermined time, the UE may transmit a D2D signal without a TA by using resources pre-indicated by the eNB or pre-configured resources even though a signal received from the eNB is equal to or larger than the threshold. Subsequently, if the UE succeeds in connected to the eNB, the UE reports to the eNB that the UE could not connect to the eNB despite a signal strength exceeding the threshold, so that the eNB may refer to the report in setting a threshold for an eNB signal in relation to a D2D operation and a timing change.

Meanwhile, for the above-descried operation for determining a D2D Tx timing and selecting resources based on the strength of a signal (RSRP/RSRQ, (E)PDCCH BLER, SS Rx performance, or the like) received from an eNB, a D2D Tx UE may report to the eNB whether the strength of a signal received from the eNB exceeds the threshold, and all or part of received signal strength information (RSRP/RSRQ, (E)PDCCH BLER, and SS Rx performance) by a physical-layer signal or a higher-layer signal. The eNB may set a threshold based on the report, and may set a Tx mode (eNB-indicated transmission or UE-autonomous transmission, resources to be used, and a resource pool to be used) and a Tx timing (transmission based on a TA or a DL Rx timing) for the D2D UE.

For the above-descried operation for determining a D2D Tx timing and selecting resources based on the strength of a signal received from an eNB, a different threshold for eNB signal strengths may be set for each mode. For example, the threshold for eNB signal strengths is set to X dB or higher for a Tx mode for transmission with TA application as indicated by the eNB, and Y dB or less for a Tx mode for transmission without a TA in a resource pool determined by the eNB. Herein, X may be set to equal to or larger than Y.

In the above-descried operation for determining a D2D Tx timing and selecting resources based on the strength of a signal received from an eNB, a timer may be set for a corresponding operation. For example, if the strength of a signal received from the eNB is equal to or less than the threshold, if the number of occurrences of a case in which the strength of a signal received from the eNB is equal to or less than the threshold is equal to or less than a predetermined value, of if the number of consecutive PDCCH detection failures is equal to or larger than a predetermined value, a timer is started at a corresponding time. If the strength of a signal received from the eNB does not exceed the threshold until expiration of the timer, a distributed scheduling-based resource pool and a D2D Tx timing (e.g., a DL timing) used for the distributed scheduling-based resource pool are applied. This operation is done in order to enable a cell-edge UE to secure a guard period and make sure operation switching, rather than immediate operation switching. A timer serving for a similar purpose may be used, when the D2D UE switches from the distributed scheduling-based resource pool to the eNB scheduled-based resource pool. However, since this switching means that the UE gets closer to the eNB and thus causes severe interference, it should be fast, compared to the opposite case. That is, compared to the opposite-direction switching, a smaller timer value is set for this switching, or at the moment the strength of a signal received from the eNB exceeds the threshold, the switching may be performed fast from the distributed scheduling-based resource pool to the eNB scheduled-based resource pool, without using such a timer.

The above operation may be performed in a similar manner, when a UE out of coverage receives resource pool information later than a D2DSS. For example, if the UE out of coverage has not received information about a resource pool to be used yet but has received an SS relayed by another UE, the UE out of coverage may expect reception of the resource pool information within a predetermined time. Thus, the UE out of coverage waits for a predetermined time, rather than it switches to the distributed scheduling mode. Then, if the information about a resource pool to be used out of coverage is configured, the D2D UE performs D2D transmission in the resources. Particularly, this operation is effective in the case where a D2DSS is transmitted by a UE connected to the network and the UE out of coverage is relatively close to the network. This operation is performed for the eNB to control interference caused by D2D transmission of the UE out of coverage. Since the UE out of coverage does not have the resource pool information for the predetermined time over which the UE waits for the resource pool information, the UE may be prohibited from D2D signal transmission or may be allowed to transmit a D2D signal at a low power level. If the UE out of coverage fails to receive the resource pool information from the UE connected to the network until the predetermined time elapses, the UE out of coverage may be allowed to transmit a D2D signal in its autonomously determined resources, pre-configured resources, or resources configured for this case.

Meanwhile, the afore-described operation for determining resources and a timing for a UE may be configured separately. For example, it may be configured that an eNB-configured timing (or a DL timing) is always used, and if the afore-mentioned specific condition (for example, the strength of a signal received from an eNB) is satisfied, a specific resource pool is used. In another example, depending on whether the specific condition is satisfied, the resources pool may still be used, but the timing may be applied differently according to an eNB-configured scheme. If timing determination and resource selection are separated, separate thresholds may be set for timing application and resource selection. For example, a timing may be changed based on a threshold x, whereas the resource pool selection may be changed based on a threshold y.

Meanwhile, different resource pools may be selected according to the presence or absence of a TA or the value of the TA in the above-described operation for setting a resource pool and a timing for a UE. For this purpose, timing information about each of specific resource pools, for example, a representative or average TA of the resource pool, TA application or non-application, or a timing offset common to the resource pool may be signaled to UEs by a physical-layer signal or a higher-layer signal from the eNB, and a D2D Tx UE may select a resource pool according to its autonomously set TA range and transmit a D2D signal in the resource pool. In other words, a resource pool-specific timing offset (or TA) for each resource pool or a TA range of a UE to use the resource pool may be preset or signaled by a physical-layer signal or a higher-layer signal from the eNB, and a Tx UE may select a Tx resource pool according to its Tx timing. This operation is intended to distinguish resources in the time domain because if UEs having very different Tx timings are multiplexed in the frequency domain, the resulting breach of orthogonality may degrade performance. The above operation may be interpreted as distinguishing resources pool according to the type of a synchronization reference of a Tx UE. For example, if the synchronization reference is an eNB (in a mode in which the synchronization reference is an eNB and a UL timing is used as a Tx timing), resource pool A is used, whereas if the synchronization reference is a UE (if an SS is from a UE out of coverage), resource pool B is used. In this manner a synchronization reference type for each resource pool (an eNB, an SS from a UE or an eNB, or a synchronization reference from a UE) may be preset or signaled by a physical-layer signal or a higher-layer signal. Or each resource pool may be identified by a synchronization source ID as well as a synchronization reference type. For this purpose, a synchronization source ID for each resource pool may be signaled by a higher-layer signal. For example, the eNB may signal to a UE by a physical-layer signal or a higher-layer signal that synchronization source ID A is used for a specific resource pool and synchronization source ID B is used for another specific resource pool. Or it may be regulated in advance that a value obtained by a modulo operation of a synchronization reference ID with the number of resource pools is selected. A resource pool having an eNB as a synchronization reference (or a synchronization reference from the eNB) and a resource pool having a UE as a synchronization reference (or a synchronization reference from the UE) may be distinguished in the time domain, and it may be determined whether an SA corresponding to each resource pool includes a TA or a TA value is used (as a TA) according to the synchronization reference type of the resource pool (whether the synchronization reference is from an eNB or a UE). That is, an SA for a resource pool with a UE as a synchronization pool is transmitted without including a TA or with a TA field fixed to a specific value, or used for another usage, whereas an SA for a resource pool with an eNB as a synchronization pool is transmitted, including a TA, which is a value derived from a TA command received from the eNB.

Signal Transmissions of D2D UE and their Priority a. Priority

A D2D discovery period may be different from a D2D communication period. For example, a few to tens of subframes per second may be configured for D2D discovery, whereas one or two subframes may be configured every 10 ms for D2D communication. In this case, there may be a subframe in which D2D discovery overlaps with D2D communication. Also, a subframe in which a UE is supposed to perform UL transmission (e.g., a subframe to carry a Sounding Reference Signal (SRS), a subframe indicated for PUSCH transmission by a DL assignment, a subframe to carry an ACK/NACK, or the like) may overlap with a subframe to carry a D2D discovery signal or a D2D communication signal. To speak more generally, a D2D discovery signal, a D2D communication signal, or a D2DSS may be transmitted in a preset resource area (resource pool) or a resource area (resource pool) configured by an eNB. Herein, it is assumed that a plurality of resource areas are configured with different periodicities, a different type of D2D signal is transmitted in each resource area, and a different Tx timing is set for each type of D2D signal. There may be a plurality of types of D2D discovery signals and a plurality of types of D2D communication signals. Further, a specific type of signal may be transmitted at a TA or a TA/2, and another specific type of signal may be transmitted at a DL Rx timing. If resources of each type have a different period, it occurs that different types of D2D signals are transmitted simultaneously as illustrated in FIG. 7. If the resource area of each type is divided into different frequency areas, the single carrier property may not be satisfied during simultaneous transmission. Or if different types of signals are to be transmitted in the same frequency resources of the same subframe, it is impossible for a Tx UE to transmit the signals simultaneously unless the Tx UE has multiple antennas. Or when a different timing is set for each type, simultaneous transmission of signals may also be impossible. In this case, there is a need for prioritizing signal transmissions.

Upon receipt of a D2D discovery resource configuration, a D2D UE may determine time resources for transmission of a D2D discovery signal based on the D2D discovery resource configuration. Different time resources may be determined for transmission of a D2D discovery signal depending on whether the D2D discovery signal is of discovery type 1 or discovery type 2B. Discovery type 1 refers to transmission of a D2D discovery signal for which a UE is allowed to select discovery resources, whereas discovery type 2B refers to transmission of a D2D discovery signal for which discovery resources are determined as indicated by an eNB. If time resources for transmission of a D2D discovery signal overlap with time resources for a UL transmission or a D2D communication signal, a signal to be transmitted in the time resources may be determined according to the priority levels of a) the UL signal, b) the D2D communication signal, and c) the D2D discovery signal. The D2D communication signal may be related to public safety. In a public safety situation (e.g., an emergency situation such as a natural disaster or a fire), the D2D communication signal should have priority over the D2D discovery signal. If an evacuation message is transmitted by a D2D communication signal in case of a natural disaster (particularly, when an eNB does not function normally due to a natural disaster, the evacuation message or the like may have to be transmitted by D2D communication), it is proper to drop the D2D discovery signal whose transmission resources are overlapped with those of the D2D communication signal. If resources for transmission of a WAN signal (e.g., a UL signal) overlap with resources for transmission of a D2D signal, priority should be given to the UL signal over the D2D signal in terms of resource use efficiency. In other words, if the D2D signal and the WAN signal are to be transmitted at the same time point, the WAN signal may always be transmitted first. For example, if a UE transmits a D2D signal in a subframe supposed to carry an ACK/NACK for a DL signal, an eNB may retransmit the DL signal, determining Discontinuous Transmission (DTX), which is inefficient because the unnecessary retransmission leads to resource waste and makes it impossible to use retransmission resources for transmission to another UE.

Transmissions of signals having different priority levels may not take place simultaneously. However, if a UL signal is an SRS, transmission of a signal having a different priority level may be allowed exceptionally. Exceptionally, if a UL signal is an SRS, a D2D signal is scheduled in the eNB-indication scheme, a TA is applied to a Tx timing of the D2D signal, and the D2D signal and a WAN signal have the same CP length, the SRS and the D2D signal may be transmitted in the same subframe. Since the SRS occupies one symbol, the SRS and the D2D signal may be transmitted in the same subframe by puncturing a predetermined area (e.g., the last symbol) of the D2D signal.

In another example, if different types of signals are to be transmitted at the same time point, a signal having a shorter period may be dropped. Because it takes a long time to retransmit a signal having a longer period, the signal having the longer period is transmitted with priority. If a D2D discovery signal and a D2D communication signal overlap over a subframe, the D2D discovery signal may be transmitted first with priority over the D2D communication signal. In general, the period of the D2D discovery signal may be set to be longer than that of the D2D communication signal. Therefore, if the D2D discovery signal overlaps with the D2D communication signal and the D2D discovery signal is dropped, a long period should be elapsed to transmit the D2D discovery signal and thus priority may be given to the D2D discovery signal over the D2D communication signal.

If different types of signals are to be transmitted at the same time point, a signal having a PUSCH timing as its timing (a D2D signal to which a TA is applied) or a signal whose transmission is indicated by an eNB may be transmitted with priority. When a signal that a UE autonomously determines to transmit and a signal indicated by the eNB are to be transmitted simultaneously, this operation gives priority to the eNB-indicated signal. The eNB-indicated signal may be a WAN signal, a D2D communication signal, or a specific D2D signal (for example, a D2D discovery signal to which the eNB allocates dedicated resources). In an embodiment, if simultaneous transmission of a type-1 discovery signal and a type-2B discovery signal in the same subframe is indicated, the type-2 discovery signal indicated by the eNB is transmitted with priority, while the type-1 discovery signal is not transmitted.

If different types of signals are to be transmitted at the same time point, the signals may be transmitted according to their priority levels which have been determined in advance. The priority levels of the signals may be preset, or may be set and signaled to UEs in an SIB or an RRC signal by the eNB. For example, in the case where a D2DSS and another D2D signal are to be transmitted simultaneously, it may be regulated that the D2DSS is transmitted in the first place. If a specific type of signal is not transmitted, it may be regulated that the specific type of signal is transmitted at a different time point in the same resource pool or in a different resource pool, to compensate for the non-transmission of the signal. In a specific example, if a type-1 discovery signal collides with a different type of signal and thus loses a transmission opportunity, the type-1 discovery signal may be transmitted in a different type of resources (for example, type-2B resources) or retransmitted at a different time point in the same type of resources.

Among D2D signals, a public safety D2D signal may be transmitted with priority over any other D2D signal. For example, in spite of the same type discovery signals, if a public safety discovery signal and a non-public safety discovery signal are transmitted at the same time point, it may be regulated that the public safety discovery signal is transmitted with priority (or the non-public safety discovery signal is dropped).

A rule may be set by combining the above methods. For example, it may regulated that although a D2D signal with a shorter period is transmitted with priority, a signal of a specific type or a signal to which an eNB allocates dedicated resources is transmitted with priority over any other signal.

b. Case of Carrier Aggregation

A case where a UE transmits a plurality of D2D signals on different carriers will be considered. If the UE should transmit only a D2D signal of a specific carrier between two carriers, the proposed method may be used. For example, if a specific carrier carries a D2D signal transmitted by using resources indicated by an eNB and the carrier carries a D2D signal transmitted in UE-selected resources, the D2D signal of the eNB-indicated resources may be transmitted first. This prioritization rule may be assigned to the specific carrier in advance. For example, if the D2D signals are transmitted in an aggregate of the carriers or on the two individual carriers, priority may be given to the specific Component Carrier (CC). For the convenience, this carrier is referred to as a D2D primary carrier or a D2D primary cell. The D2D primary carrier may be indicated in advance by the network or selected by the UE. Or a rule of selecting a primary carrier may be preset. For example, a rule of selecting a low-frequency carrier or a carrier of a public safety band may be preset. When D2D signals are allowed to be transmitted simultaneously on a plurality of carriers, the primary carrier may be indicated as a carrier to which transmission power should be allocated with priority. For example, if the UE should transmit D2D signals simultaneously on two CCs, the UE allocates transmission power to the primary CC first and then the remaining power to the other carrier. Meanwhile, in the case of intra-band CA, there may be a limit on the power difference between CCs. Since one CC is interfered by another adjacent CC near to the CC in frequency, similar transmission power is set for the two CCs. If after power is allocated to the primary carrier, the remaining power for the other CC does not satisfy the power difference condition for two CCs, it may be regulated that the D2D signal of the carrier other than the primary carrier is dropped.

It is assumed that CC1 is a commercial (or public safety) band, and a public safety or emergency call request is transmitted on CC2. It is also assumed that situation 1) is a case in which an emergency call is generated and thus D2D transmission (or reception) is to be performed on CC2 during D2D mode 1 communication (commercial) or WAN signal transmission on CC1, situation 2) is a case in which an emergency call is generated and thus D2D transmission (or reception) is to be performed on CC2 during D2D type 1 discovery transmission (or reception) (or mode 2 communication) on CC1, and situation 3) is a case in which an emergency call is generated and thus D2D transmission (or reception) is to be performed on CC2 during transmission (or reception) of a D2D discovery signal or D2D communication signal for public safety on CC1. In these situations, a D2D signal for public safety is to be transmitted (or received) on CC2 during D2D signal transmission (or reception) (mainly for the commercial purpose) or WAN signal transmission (or reception) on CC1. For these situations, UE operations should be defined. Particularly, when the UE has only a single Tx (or Rx) circuit or it is impossible for the UE to simultaneously transmit signals on a plurality of CCs, a rule of performing an operation on a specific CC with priority should be set. Specifically, the following operations may be defined.

Operation 1: CCs may be prioritized according to the usages of the CCs. A D2D signal may be transmitted (or received) on a CC of a public safety band with priority from among the CCs. For example, if CC1 is a commercial band and CC2 is a public safety band, D2D signal transmission on CC2 has priority over D2D signal transmission on CC1. The priority levels of the CCs may be preset or signaled to UEs from the network by a physical-layer signal or a higher-layer signal.

Operation 2: D2D signals may be prioritized according to their types. A public safety D2D signal is always transmitted and received with priority over a commercial D2D signal. Operation 2 is different from operation 1 in that D2D signals are prioritized according to their types irrespective of CCs or for the same usage of CCs. For example, in the case where transmission and reception of commercial and public safety D2D signals are allowed on both CC1 and CC2, if a public safety D2D signal is transmitted (or received) on a specific CC, transmission (or reception) of the public safety D2D signal on the specific CC always has priority over transmission (or reception) of a commercial D2D signal on the other CC. Specifically, the priority levels of public safety and commercial D2D signals (signal type: communication or discovery, scheduling type: eNB indication or UE autonomous, and service type: public safety or commercial) may be preset or signaled from the network by a physical-layer signal or a higher-layer signal. For example, the priority levels of the D2D signals may be preset in the order of public safety mode 1 communication>public safety type 2 discovery>public safety mode 2 communication>public safety type 1 discovery>commercial mode 1 communication>commercial type 2 discovery>commercial mode 2 communication>commercial type 1 discovery. In another example, prioritization conditions for D2D signals may be set such that 1) signal type: communication>discovery, 2) scheduling type: eNB-indicated>UE autonomous, 3) service type: public safety>commercial, and 4) scheduling period: long period>short period. If all other conditions are the same, a signal having priority in a corresponding condition may be transmitted first. A condition having priority over the other conditions may be preset, or the priority levels of the prioritization conditions may be signaled by the network. For example, it may be preset that condition 3) (public safety or commercial) always has priority over the other conditions. However, the above condition prioritization is purely exemplary and thus the conditions may be prioritized in a different manner. Or an additional condition may be set, or the priority levels of the conditions or the priority levels of D2D signals may be set by a network configuration.

Operation 3: Signaling to an eNB may be performed. If a UE should transmit another (public safety) D2D signal on CC2 during transmission of a commercial or public safety D2D signal or WAN signal as indicated by the eNB on CC1, the UE may transmit, to the eNB, a signal indicating that a D2D signal may not be transmitted on CC1 in view of the operation on CC2. For example, the D2D UE may signal to the eNB on CC1 that a D2D signal may not be transmitted (or received) on CC1 later or for a predetermined time. Upon receipt of the report from the D2D UE, the network may use corresponding resources for another usage, determining that the resources are not used by the D2D UE (later or for the predetermined time). In another method, the UE may signal a transmission power value to be used for D2D to the eNB. In this case, the eNB may control WAN transmission power and allocate the remaining power to D2D in consideration of the power class (or maximum transmission power) of the UE.

Prioritization may be performed in combination of the above operations. Priority levels may be set using Operation 1 and Operation 2 in combination. For example, transmission (or reception) of a specific D2D signal may have a highest priority level on a specific CC. In another example, a specific CC has priority over another CC (this may mean that a predetermined offset may be applied to a signal on the specific CC, or some D2D signal on the specific CC may always have priority over a D2D signal on another CC), and a prioritization condition or rule for each D2D signal may be preset or indicated by the network.

In a specific example of the above description, in the case where a commercial D2D signal is transmitted (or received) on CC1, if resources for the commercial D2D signal are indicated by an eNB as in mode 1 communication or type 2 discovery, even though a public safety signal is supposed to be transmitted on CC2, the D2D signal transmission on CC1 has priority over the public safety signal transmission on CC1. This rule relies on the principle that eNB-indicated resources have a highest priority level. If the eNB allocates resources but a UE first performs the transmission on CC2 without transmitting the D2D signal on CC1 in the allocated resources, the resources allocated on CC1 by the eNB are wasted. If there are a small number of UEs, this problem may not be severe. On the contrary, if there are many UEs, the amount of wasted resources increases, thereby causing resource use inefficiency.

If both the D2D signal transmission on CC1 and the public safety signal transmission on CC2 are for mode 1 communication or type 2 discovery, the public safety signal transmission is performed first according to Operation 2.

If CC1 is meant for D2D signal transmission for the commercial usage in the eNB-indicated resource allocation scheme, and CC2 is meant for D2D signal transmission for the public safety usage in the UE-autonomous resource allocation scheme (mode 2 communication or type 1 discovery), it may be regulated that priority is given to the D2D signal transmission on CC2 according to the condition of public safety first or the D2D signal transmission on CC1 according to the condition of eNB-indicated resources first.

If D2D signal transmission (or reception) having a higher priority level (e.g., an emergency call) is requested on CC2 during transmission of a D2D signal of mode 2 communication or type 1 discovery on CC1, the UE may perform the D2D signal transmission on CC2 having the higher priority level according to preset prioritization.

TA for D2D Rx UE

A D2D Tx UE may minimize a guard period by transmitting a signal at a PUSCH timing to which a TA is applied, and indicate the TA, an average (or maximum or minimum) TA, or a TA range to a D2D Rx UE so that the D2D Rx UE may receive the transmitted signal. The D2D Rx UE may receive the signal after detecting a D2D communication signal at a time point obtained by applying the TA to its DL timing or D2DSS Rx timing. Or the D2D Rx UE may apply a TA indicated by an SA to an Rx timing of the SA transmitted by the D2D Tx UE. For this purpose, the D2D Rx UE may estimate the Rx timing of the SA based on a DMRS of the SA. Or it may be regulated that the D2D Tx UE always transmit a D2DSS. In this case, the D2D Rx UE may set an FFT window at a TA position indicated by the SA with respect to an Rx timing of the DMRS from the D2D Tx UE. It is assumed herein that a DL timing is used as a D2DSS Tx timing.

For example, a case in which a D2D Tx UE transmits a signal by applying a TA and signals a maximum TA of a cell to a D2D Rx UE will be considered. A maximum timing error occurs between the Tx UE and the Rx UE in both cases of FIG. 8. The maximum timing error occurs when two UEs are located at a cell center as illustrated in FIG. 8(a), and when one of two UEs is at a cell center and the other UE is at a cell edge as illustrated in FIG. 8(b). In the illustrated case of FIG. 8(b), because the UEs are far from each other within a cell, the strength of an Rx signal is relatively weak. Thus, the timing error does not matter much. On the other hand, in the illustrated case of FIG. 8(a), a great timing error occurs between the UEs near to each other. As a result, if a CP length is smaller than a TA length, the timing error may cause ISI, thereby decreasing a signal detection capability significantly.

To avert this problem, a different D2D Rx signal offset may be set according to the strength of a signal received from an eNB or a distance from the eNB. The eNB may set not a single Rx offset but a plurality of Rx offsets for a D2D Rx UE. Also, in the case wherein the eNB configures one D2D Rx signal, if the D2D Rx UE satisfies a specific condition, a D2D Rx signal offset different from a D2D Rx signal offset indicated by the eNB may be applied by introducing a predetermined offset or scaling factor. The specific condition may be that the distance between the D2D Rx UE and the eNB, the quality (RSRP or RSRQ) of a signal received from the eNB, or the like is equal to or larger than, or equal to or less than a predetermined threshold. That is, the D2D Rx UE may selectively sets an Rx timing offset according to the distance to the eNB or the received signal quality, and perform an Rx operation using the Rx timing offset. For example, if the eNB sets a maximum TA value as a D2D signal Rx timing offset, UEs for which distances to the eNB or the quality of a signal received from the eNB is equal to or less than a predetermined threshold may apply an offset of 0 to TA/2, and UEs for which distances to the eNB or the quality of a signal received from the eNB is larger than the predetermined threshold use the timing offset set by the eNB. The threshold for a distance to the eNB or the quality of a signal received from the eNB may be preset or configured by the eNB. If the threshold is configured by the eNB, it may be signaled to D2D UEs by a physical-layer signal or a higher-layer signal.

Figure 9:
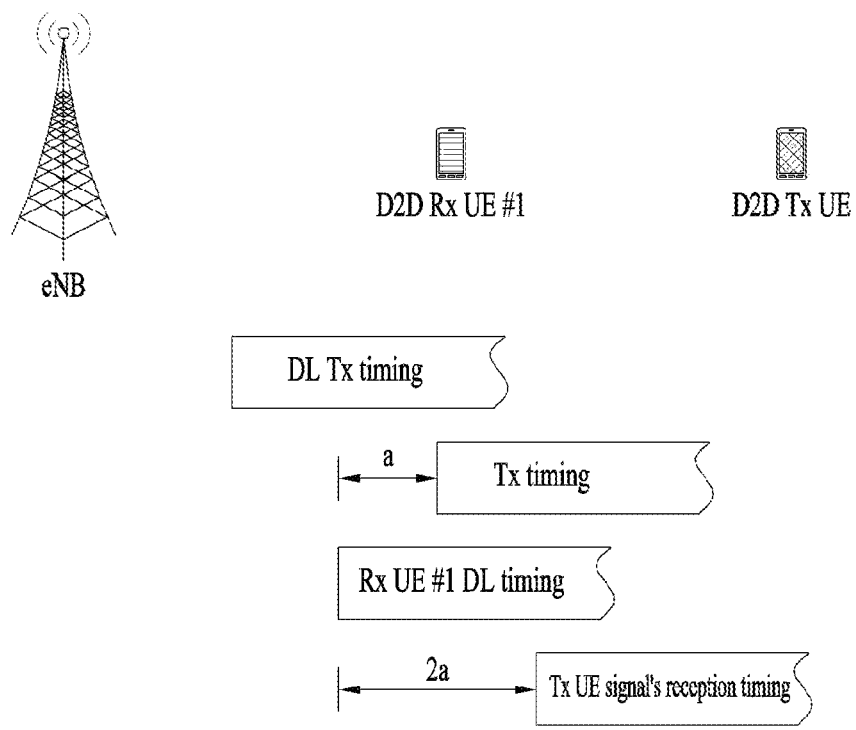

Meanwhile, it may not be always necessary to accurately indicate a TA of a Tx UE to an Rx UE. The Tx UE may transmit a signal using the TA and indicate a value (TA/2 or DL timing) less than the TA to the Rx UE. In this case, a maximum timing error occurs when a UE farthest from a timing source transmits a signal and a UE close to the timing source receives the signal, as illustrated in FIG. 9. The difference between a Tx timing and an Rx timing may become the double of a propagation delay difference (when viewed from a two-dimensional plane, the transmission probability of a UE far from a synchronization source is higher than that of a UE close to the synchronization source).

In order to reduce a timing error in the worst case, a Tx timing may be set to be different from a timing indicated to an Rx UE. Specifically, when indicating a TA or TA information, the eNB may set a value less than the TA on purpose (to reduce an error in the worst case) and signal the value to the D2D Rx UE, or signal a specific offset in addition to the TA or TA information to the D2D Rx UE. To reduce a WAN impact on the Tx UE, the number of available REs may be maximized by using a PUSCH timing as a Tx timing. If a value less than a Tx is allocated as an indicated timing to the Rx UE, a timing error in the worst case may be reduced. Herein, the indicated timing may be zero in an extreme case. In this case, there is no need for separately transmitting an SS for D2D communication (an SS for discovery may be shared).

If the indicated timing is a non-zero value, the indicated timing may be a value configured by a higher-layer signal such as an RRC signal (a value configured based on a maximum TA of a cell by the eNB), the TA of the Tx UE, or a value derived from the TA. If the indicated timing is derived from the TA of the D2D Tx UE, the eNB may signal the indicated timing, the D2D Tx UE may directly transmit the indicated timing in communication data (there should be a packet carrying timing information at an initial transmission or periodically), or a D2DSS may be transmitted separately for D2D communication.

The eNB may indicate D2DSS transmission within the coverage, and a Tx timing of a D2DSS for D2D communication may be indicated separately from a Tx timing of a D2DSS for discovery. The Tx timing of the D2DSS for communication may be set based on the TX of the Tx UE, as an average TA of Tx UEs within the cell, or based on a maximum TA. When indicating transmission of a D2DSS for D2D communication to a specific UE, the eNB may also indicate a Tx timing of the D2DSS (the TA or a value related to the TA). The Tx timing of the D2DSS may be signaled by a physical-layer signal or a higher-layer signal. Upon receipt of the Tx timing, the D2DSS Tx UE may transmit the D2DSS at the timing indicated by the eNB, or transmit information about the timing in a PD2DSCH.

A D2D Tx UE may determine a Tx time point by applying a specific offset or rate to a TA without just using the TA. For example, upon receipt of a TA from the eNB, the D2D Tx UE may apply offset a to the TA and thus transmit a signal at a time point after the TA. Or the D2D Tx UE may determine a D2D Tx time point by applying a rate/b to the TA. This is done because if a D2D Rx UE receives a D2D signal without additional signaling, the timing is very different from the TA and thus the D2D Rx UE may not receive the D2D signal successfully. If this timing is used, the Tx UE may use a format other than a format for TA application. For example, a format in which a partial area of the last part of a D2D subframe is punctured according to the difference between the TA and the D2D signal Tx time may be used. Herein, an Rx time (a time point obtained by applying an offset to a DL Rx time) may be signaled to the D2D Rx UE from the eNB by a higher-layer signal such as an RRC signal, or the D2D Rx UE may receive the D2D signal at the DL Rx time without additional signaling. Without additional signaling of the Tx time of the Tx UE, the Rx UE may not determine the size of a guard period accurately. Thus, the Rx UE may detect symbol energy, and if the symbol energy is equal to or higher than a predetermined threshold, the Rx UE may decode the symbol. Or only an RS may be mapped to the guard period. In this case, only if an RS reception quality is equal to or larger than a predetermined threshold, the D2D Rx UE may use the RS for demodulation.

Figure 10:
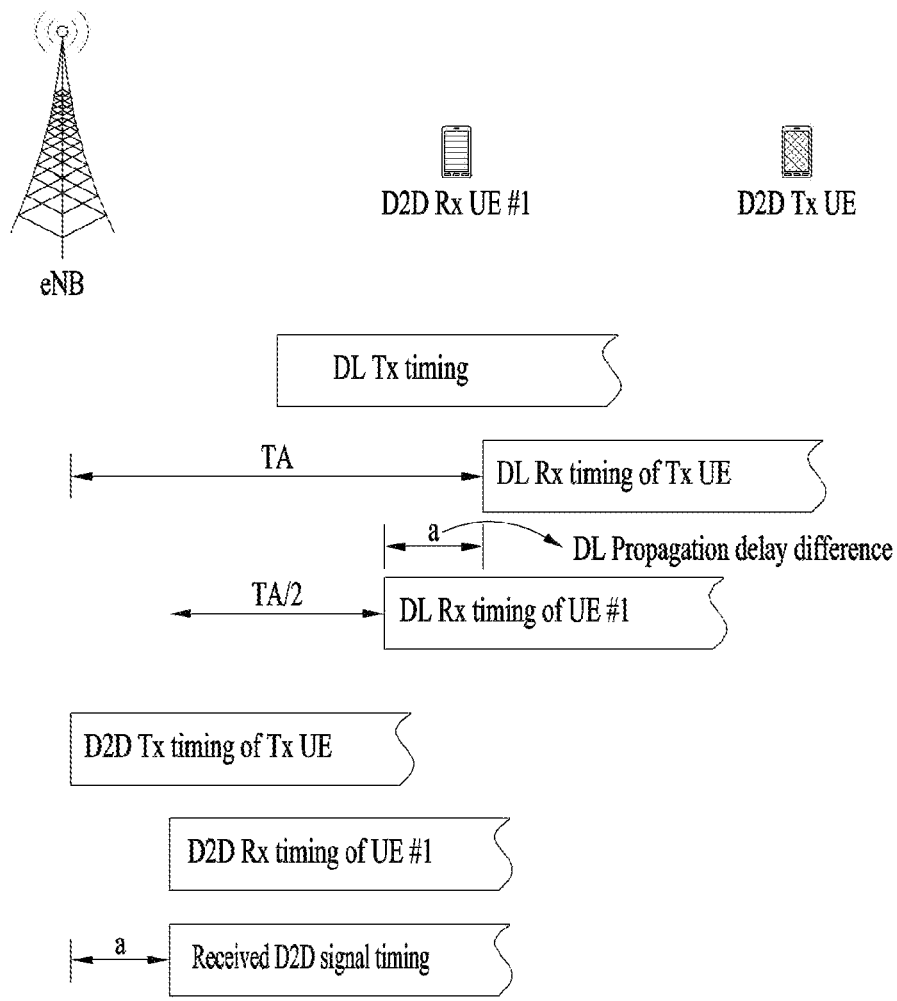

In the foregoing embodiment, if a D2D Tx UE transmits a D2D signal by applying a specific offset or scaling factor to a TA, information about the offset or scaling factor applied to the TA or a specific offset including (reflecting) the information may be signaled to a D2D Rx UE. For example, if the Tx UE transmits a D2D signal at a timing of TA/2, an eNB may indicate an offset of up to TA/2 to an Rx UE, as illustrated in FIG. 10. This operation is intended to indicate an earliest arrival time according to a D2D signal Tx time, and the earliest signal arrival time may be changed according to the offset or scaling factor applied to the Tx UE. In another example, if the Tx UE transmits a signal by applying a specific offset to a TA, the eNB may indicate a value obtained by applying the offset to a maximum TA to an Rx UE.

Configurations of Apparatuses According to Embodiment of the Present Invention

Figure 11:
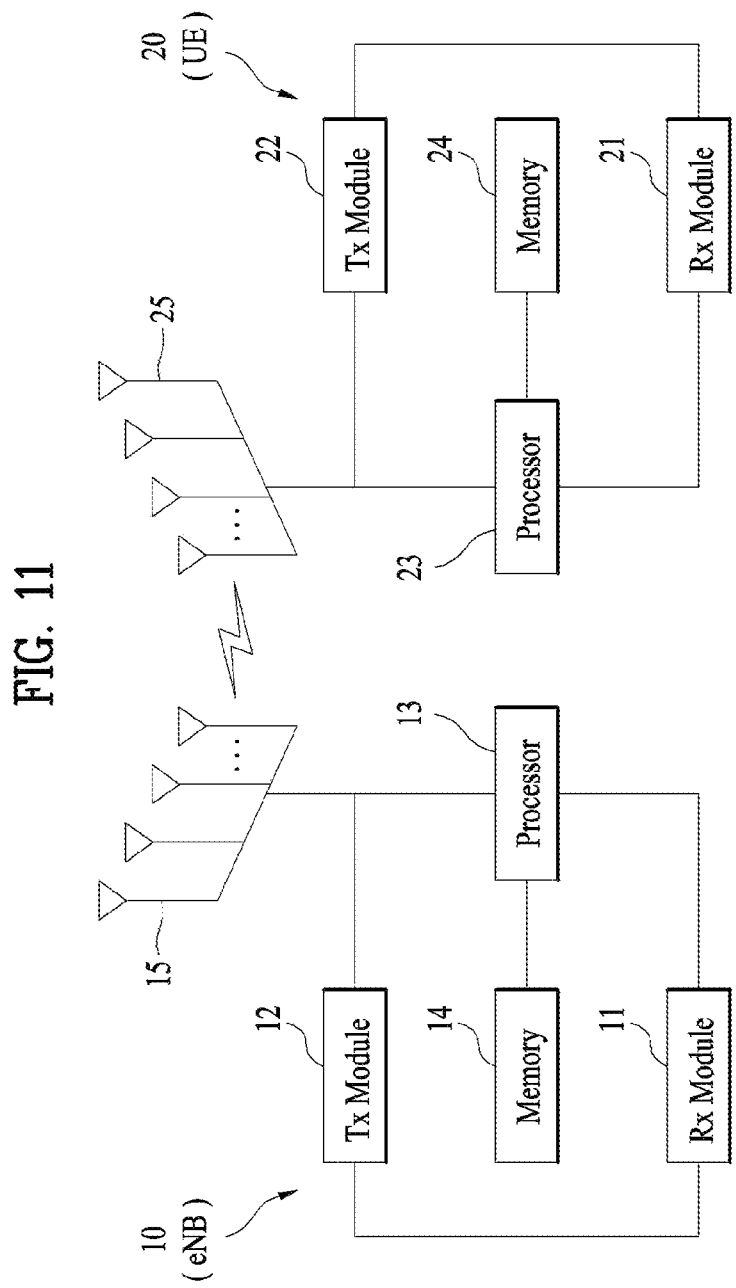
FIG. 11 is a block diagram of a transmission apparatus and a reception apparatus.

FIG. 11 is a block diagram of a transmission point and a UE according to an embodiment of the present invention.

Referring to FIG. 11, a transmission point 10 according to the present invention may include an Rx module 11, a Tx module 12, a processor 13, a memory 14, and a plurality of antennas 15. Use of the plurality of antennas 15 means that the transmission point 10 supports Multiple Input and Multiple Output (MIMO) transmission and reception. The Rx module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 11 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 11 is applicable to a relay as a DL transmitter or a UL receiver, and the description of the UE 20 in FIG. 11 is applicable to a relay as a DL receiver or a UL transmitter.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

The invention claimed is:

1. A method for transmitting and receiving a signal by a Device-to-Device (D2D) User equipment (UE) in a wireless communication system, the method comprising:
receiving a D2D communication resource configuration; and
transmitting a D2D communication signal based on the D2D communication resource configuration,
wherein when the D2D UE transmits the D2D communication signal by using resources indicated by a base station, the D2D communication signal is transmitted at a first timing determined from a Timing Advance (TA), and when the D2D UE selects resources for transmission of the D2D communication signal, the D2D communication signal is transmitted at a second timing determined irrespective of the TA.

2. The method according to claim 1, wherein the first timing is determined from a value ($N_{TA}$) determined from the TA and a fixed TA offset ($N_{TAoffset}$).

3. The method according to claim 2, wherein the first timing is defined by $(N_{TA}+N_{TAoffset})*Ts$, where $N_{TA}$ is $16*TA$, $N_{TAoffset}$ is a fixed TA offset, and Ts is a basic time unit.

4. The method according to claim 3, wherein $N_{TAoffset}$ is 625 in Time Division Duplex (TDD) and 0 in Frequency Division Duplex (FDD).

5. The method according to claim 1, wherein the first timing is an uplink timing of the D2D UE.

6. The method according to claim 1, wherein when the first timing is used, the D2D UE is in transmission mode 1.

7. The method according to claim 1, wherein the second timing is not related to a TA command.

8. The method according to claim 1, wherein the second timing is predetermined.

9. The method according to claim 1, wherein the second timing is defined by $N_{TAoffset}*Ts$ where $N_{TAoffset}$ is a fixed TA offset and Ts is a basic time unit.

10. The method according to claim 1, wherein the second timing is a downlink timing.

11. The method according to claim 1, wherein when the second timing is used, the D2D UE is in transmission mode 2.

12. A Device-to-Device (D2D) User equipment (UE) for transmitting and receiving a D2D signal in a wireless communication system, the D2D UE comprising:
a transmitter and a receiver; and
a processor, operably coupled to the transmitter and the receiver, that:
controls the receiver to receive a D2D communication resource configuration, and the transmitter to transmit a D2D communication signal based on the D2D communication resource configuration,
wherein when the D2D UE transmits the D2D communication signal by using resources indicated by a base station, the D2D communication signal is transmitted at a first timing determined from a Timing Advance (TA), and when the D2D UE selects resources for transmission of the D2D communication signal, the D2D communication signal is transmitted at a second timing determined irrespective of the TA.

* * * * *